(12) United States Patent
Yan et al.

(10) Patent No.: US 8,428,649 B2
(45) Date of Patent: Apr. 23, 2013

(54) MEMORY DEVICE UPGRADE

(75) Inventors: Mei Yan, Cupertino, CA (US); Robert C. Chang, Danville, CA (US); Farshid Sabet-Sharghi, Los Altos Hills, CA (US); Po Yuan, Milpitas, CA (US); Bahman Qawami, San Jose, CA (US)

(73) Assignee: SanDisk Technologies Inc., Plano, TX (US)

( * ) Notice: Subject to any disclaimer, the term of this patent is extended or adjusted under 35 U.S.C. 154(b) by 790 days.

(21) Appl. No.: 12/229,090

(22) Filed: Aug. 20, 2008

(65) Prior Publication Data

US 2010/0048169 A1    Feb. 25, 2010

(51) Int. Cl.
*H04B 1/38*    (2006.01)

(52) U.S. Cl.
USPC ........... 455/558; 455/410; 455/418; 455/419; 455/420; 455/550.1; 726/1; 726/2; 726/3; 726/4; 726/5; 717/168; 717/169; 717/170; 717/171

(58) Field of Classification Search .................. 455/410, 455/418–420, 550.1, 556.1, 558; 726/1–9, 726/26–32; 717/168–173
See application file for complete search history.

(56) References Cited

U.S. PATENT DOCUMENTS

| 5,418,837 | A  | 5/1995 | Johansson et al. |
|---|---|---|---|
| 7,036,020 | B2 | 4/2006 | Thibadeau |
| 7,058,818 | B2 | 6/2006 | Dariel |
| 7,215,771 | B1 | 5/2007 | Hamlin |
| 7,426,747 | B2 | 9/2008 | Thibadeau |
| 7,493,656 | B2 | 2/2009 | Goodwill et al. |
| 7,685,071 | B2 * | 3/2010 | Terauchi et al. ................. 705/59 |
| 8,095,132 | B2 * | 1/2012 | Cheng et al. ............... 455/435.1 |
| 2004/0067772 | A1 * | 4/2004 | Gaumain ........................ 455/558 |
| 2004/0162105 | A1 | 8/2004 | Reddy et al. |
| 2005/0026595 | A1 | 2/2005 | Huckins |

(Continued)

FOREIGN PATENT DOCUMENTS

| EP | 1 280 149 | 1/2003 |
|---|---|---|
| WO | 2007/068263 | 6/2007 |

(Continued)

OTHER PUBLICATIONS

U.S. Appl. No. 11/967,641 entitled, "Method and System for Creating and Accessing a Secure Storage Area in a Non-Volatile Memory Card", filed Dec. 31, 2007, 44 pages.
U.S. Appl. No. 12/229,165 entitled, "Accessing Memory Device Content Using a Network", filed Aug. 20, 2008, 44 pages.

(Continued)

*Primary Examiner* — Fayyaz Alam
(74) *Attorney, Agent, or Firm* — Brinks Hofer Gilson & Lione

(57) ABSTRACT

Technology for replacing a first storage unit operatively coupled to a device is provided. Content of the first storage unit is sent to a new storage unit that serves as the replacement of the first storage unit. In one embodiment, the content is first sent to a trusted third-party server and then transferred from the server to the new storage unit. A portion of the content on the new storage unit is adjusted in one embodiment to maintain content security features that were implemented in the first storage unit. The upgrading can be performed under the control of a software entity that is installed on the device. In various embodiments, the first storage unit may be bound to a third storage unit prior to the upgrade process. In such cases, the process can include measures to bind the new storage unit to the third storage unit.

28 Claims, 16 Drawing Sheets

U.S. PATENT DOCUMENTS

| | | | |
|---|---|---|---|
| 2006/0236405 A1* | 10/2006 | Terauchi et al. | 726/27 |
| 2006/0242068 A1* | 10/2006 | Jogand-Coulomb et al. | 705/50 |
| 2007/0043667 A1 | 2/2007 | Qawami et al. | |
| 2007/0136509 A1 | 6/2007 | Agami | |
| 2007/0167161 A1* | 7/2007 | Cheng et al. | 455/435.1 |
| 2007/0218945 A1* | 9/2007 | Agami et al. | 455/558 |
| 2007/0259691 A1 | 11/2007 | Santos Garcia | |
| 2008/0010450 A1 | 1/2008 | Holtzman et al. | |
| 2008/0162947 A1* | 7/2008 | Holtzman et al. | 713/193 |
| 2008/0163336 A1* | 7/2008 | Feng et al. | 726/1 |
| 2008/0289044 A1* | 11/2008 | Choi | 726/26 |
| 2008/0300020 A1* | 12/2008 | Nishizawa et al. | 455/558 |

FOREIGN PATENT DOCUMENTS

| | | |
|---|---|---|
| WO | 2008/060467 | 5/2008 |
| WO | 2008/080431 | 7/2008 |
| WO | WO 2009/070430 A2 | 6/2009 |

OTHER PUBLICATIONS

International Search Report issued in international application No. PCT/US2009/054015, mailed on Mar. 5, 2010 (9 pages).

Written Opinion issued in international application No. PCT/US2009/054015, mailed on Mar. 5, 2010 (12 pages).

Announcement Open Mobile Alliance: DRM Architecture—Candidate Version 2.0, dated Jul. 15, 2004 (24 pages).

International Preliminary Report on Patentability issued in international application No. PCT/US2009/054015, mailed Mar. 3, 2011 (12 pages).

European Office Action dated Jul. 20, 2012 for co-pending Australian Patent Application No. 09791573.

U.S. Appl. No. 11/557,028, filed Nov. 6, 2006 entitled "Content Control Method Using Certificate Chains" (US Publn. No. 2008-0010450A1; Patent No. 8,140,843).

\* cited by examiner

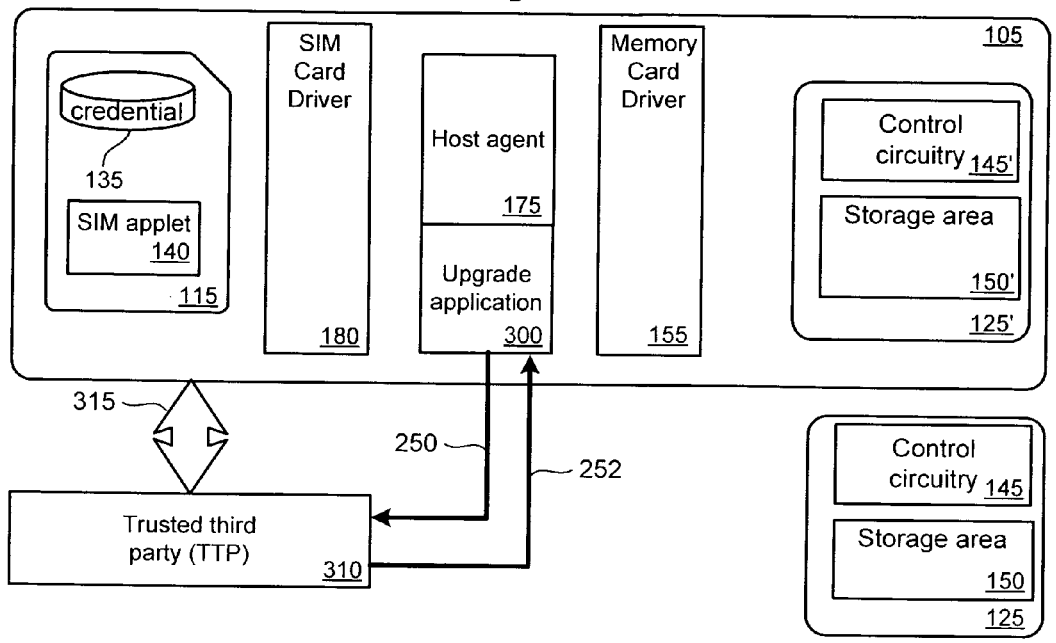
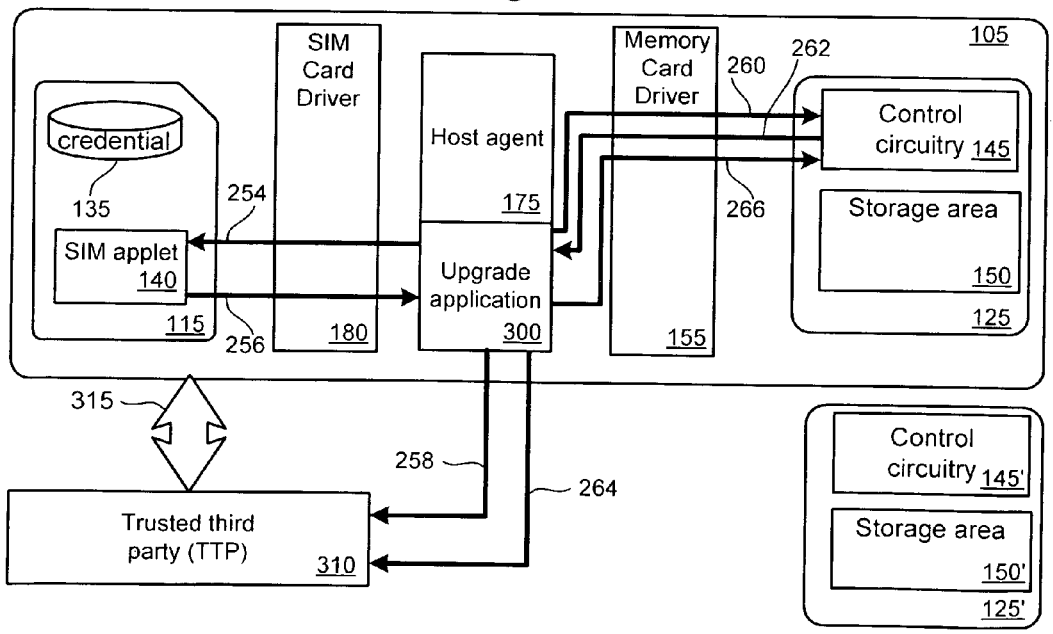

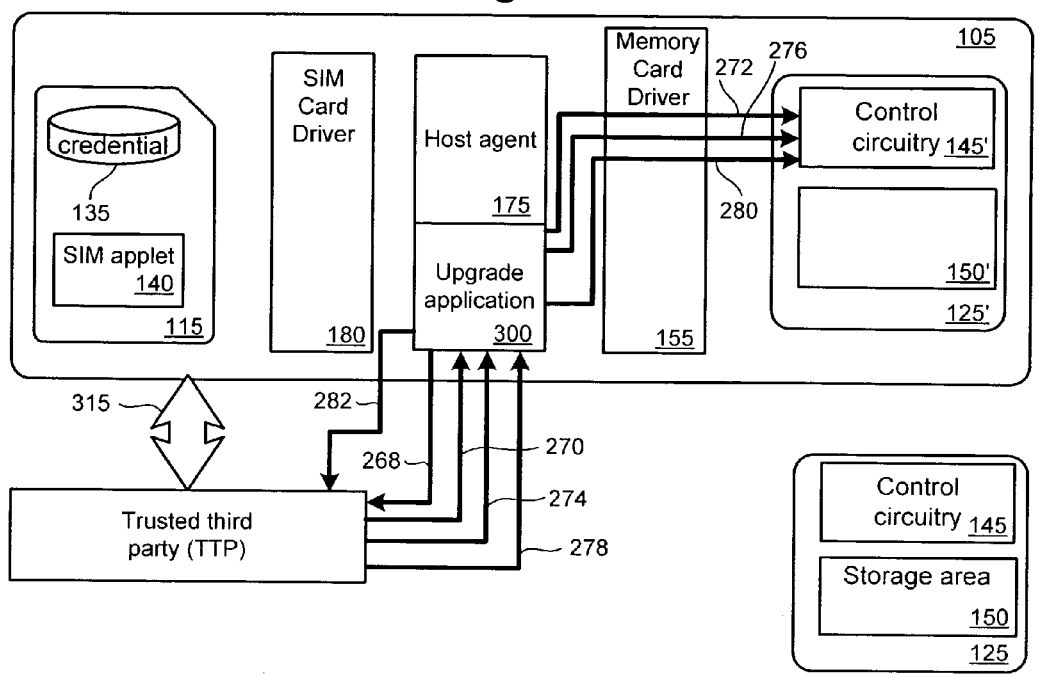

MEMORY DEVICE UPGRADE

BACKGROUND

1. Field

Embodiments of the present disclosure relate to technology for secure memory devices.

2. Description of the Related Art

Semiconductor memory has become more popular for use in various electronic devices. For example, non-volatile semiconductor memory is used in cellular telephones, digital cameras, mobile media players, personal digital assistants, mobile computing devices, non-mobile computing devices and other devices.

Preventing unauthorized access to a secure non-volatile semiconductor memory device has become a greater concern as technology has advanced. An example of a secure memory device is a Subscriber Identity Module (SIM) card or a removable memory card that may contain secure content that should be protected from unauthorized use.

Protecting content stored on secure memory devices has become an important feature, especially concerning protection for copyrighted material. For example, a user may purchase copyrighted content, such as music, through an electronic device. Content owners typically intend for only the purchaser to use the content and may require that the purchased content be played only by authorized applications on an electronic device, such as the application used to purchase the content.

Securely storing information to protect against unauthorized use of secure content can be performed using a variety of protection techniques, such as encryption. An application on a device that tries to access encrypted content must decrypt the content using an encryption key before that content can be read. An application authorized to access the encrypted content will have the appropriate encryption key for decrypting the content. Unauthorized applications may still be able to access the encrypted content, but without the appropriate encryption key, the unauthorized application may not be able to read the content.

Although there are a variety of protection techniques that a secure memory device may implement, if a secure memory device is upgraded to a new memory device, the protection may be lost during the upgrade. There is a need for an improved, simplified, and secure way of upgrading a memory device to ensure the security features of the memory device are retained.

SUMMARY

The technology described herein pertains to upgrading or replacing a first storage unit that is operatively coupled to a host device. The upgrading is performed by sending content of the first storage unit to a new storage unit that serves as the upgrade to or replacement of the first storage unit. In one embodiment, the content is first sent to a trusted third-party server. The content is then transferred from the trusted third-party server to the new storage unit. A portion of the content on the new storage unit is adjusted in one embodiment to maintain content security features that were implemented in the first storage unit. The upgrading can be performed under the control of a software entity that is installed on the device.

In various embodiments, the first storage unit may be bound to a third storage unit prior to the upgrade process. The first storage unit and the third storage unit may be said to be bound together where one storage unit provides credentials for accessing content on the other storage unit. In such cases, the upgrade process can include measures to bind the new storage unit to the third storage unit in the same or a similar manner to the way the first storage unit was bound to the third storage unit prior to the upgrade. Some of the content transferred to the new storage unit and/or content on the third storage unit may be modified so as to bind the new storage unit to the third storage unit.

Consider an exemplary embodiment where a non-volatile memory card and a subscriber identity module (SIM) card are both operatively coupled to a host device. The cards may be bound together based one or more binding types associated with content stored on the non-volatile memory card. The SIM card can store and/or calculate credentials that are used to access the content on the non-volatile memory card. Embodiments in accordance with the present disclosure can be used to replace the existing non-volatile memory card with a new non-volatile memory card and/or replace the existing SIM card with a new SIM card. In either case, the presently disclosed technology facilitates replacement of the card(s) while maintaining the security measures used to protect the content stored on the existing non-volatile memory card.

If the existing non-volatile memory card is replaced with a new non-volatile memory card, content on the existing non-volatile memory card can be transferred to the new non-volatile memory card. At least a portion of the transferred content may be modified so as to bind the new non-volatile memory card to the existing SIM card. Additionally, one or more new credentials may be calculated and stored by the SIM card for accessing the content transferred to the new non-volatile memory card. If the existing SIM card is replaced with a new SIM card, one or more credentials from the existing SIM card can be transferred to the new SIM card. If certain binding types for content on the existing non-volatile memory card are used, new credentials may be calculated and stored by the SIM card and/or modifications to the content on the existing non-volatile memory card may be made.

Various embodiments and possible examples of the disclosed technology are provided herein. One embodiment includes a process for replacing a first storage unit with a new storage unit. Prior to replacement, the first storage unit is operatively coupled to a host device and is bound to a third storage unit that is also operatively coupled to the host device. The first storage unit stores first content that is bound to the third storage unit based on one or more binding types. After receiving a request to replace the first storage unit with the new storage unit, the device sends the first content from the first storage unit to the new storage unit. The device modifies a portion of the first content in the new storage unit and a portion of second content in the third storage unit based on the one or more binding types so that the new storage unit is bound to the third storage unit. The device can send the first content from the first storage unit to a server in one embodiment. The first storage unit can then be removed from the device and the new storage unit inserted. The device can then receive the first content from the server and send it to the new storage unit.

One embodiment of a process for upgrading a storage device includes sending a credential from a first storage unit to a server. The first storage unit is operatively coupled to a device. The credential is sent to the server under the control of a software entity on the device. The software entity notifies a user to insert a new storage unit in the device. The software entity receives a notification that the new storage unit is inserted. The software entity controls receiving the credential from the server and sending the credential to the new storage unit.

One embodiment of a process for upgrading a storage device includes upgrading a first storage unit in a host device to a new storage unit. The first storage unit is associated with a third storage unit based on one or more credentials, and the first storage unit and third storage unit are operatively to the host device. A software entity on the host device provides to a server an identifier that identifies the new storage unit when inserted in the host device. The software entity accesses content on the first storage unit using one or more credentials obtained from the third storage unit. The software entity then provides the content to the server. The software entity controls receipt of the content from the server including first content associated with the third storage unit based on the one or more credentials. The content is sent to the new storage unit under control of the software entity, which notifies the third storage unit to generate new credentials that associate the first content with the new storage unit. The new credentials provide access to the first content.

The technology described herein further pertains to accessing content on a first host device where the content is associated with one or more credentials on a second host device. A first storage unit on or controlled using the first host device may be bound to a second storage unit that is on or controlled using the second host device based on binding types for the content on the first storage unit. The second storage unit is needed to calculate a credential for access to the content on the first storage unit. When content on the first storage unit is requested through the first host device, the first host device calculates an account identifier associated with the binding type for the requested content. The account identifier will be sent from the first host device to a server. The server will send the account identifier to the second host device. The second storage unit will use the account identifier to calculate a credential. The credential is then sent to the server, and the server sends the credential to the first host device. The first host device will use the credential to access the requested content if the credential is valid.

One embodiment of a process for accessing content includes determining in a first device an account identifier associated with content on a first storage unit that is operatively coupled to the first device. The account identifier is sent from the first device to a server. The first device receives a credential from a second device via the server, where the credential is based on the account identifier. The first device accesses the content using the credential if the credential is valid.

One embodiment of a process for accessing content includes receiving at a server an account identifier from a first device. The account identifier is associated with content on a first storage unit that is operatively coupled to the first device. The account identifier is sent from the server to a second storage unit that is operatively coupled to a second device. The second storage unit is associated with the first storage unit. The server receives a credential from the second storage unit in response to sending the account identifier. The credential is based on the account identifier. The server sends the credential to the first device. The credential provides access to the content on the first storage unit if the credential is valid.

One embodiment of a process for accessing content includes receiving a request to access content on a first memory card that is operatively coupled to a first device. The first memory card is bound to a second memory card based on a binding type. The second memory card is operatively coupled to a second device. The receiving is performed by a software entity on the first device. The software entity calculates an account identifier based on the binding type and sends the account identifier to the server. The software entity receives a credential from the server. The credential is generated by the second memory card based on the account identifier and the binding type. The software entity accesses the content using the credential if the credential is valid.

One embodiment of a process for accessing content includes calculating at a first device an account identifier associated with content on a first storage unit that is operatively coupled to the first device. The first storage unit is associated with a second storage unit that is operatively coupled to a second device. The account identifier is sent from the first device to the second device through a server. The second storage unit generates a credential based on the account identifier. The first device receives the credential from the second storage unit through the server and accesses the content on the first storage unit if the credential is valid.

Embodiments in accordance with the present disclosure can include one or more non-volatile storage units and one or more processors in communication with the one or more non-volatile storage units. The one or more processors can be adapted to perform one or more processes to upgrade or access at least one non-volatile storage unit as described. Embodiments in accordance with the present disclosure can be accomplished using hardware, software or a combination of both hardware and software. The software can be stored on one or more computer readable media such as hard disk drives, CD-ROMs, DVDs, optical disks, floppy disks, tape drives, RAM, ROM, flash memory or other suitable storage device(s). In alternative embodiments, some or all of the software can be replaced by dedicated hardware including custom integrated circuits, gate arrays, FPGAs, PLDs, and special purpose processors. In one embodiment, software (stored on a storage device) implementing one or more embodiments is used to program one or more processors. The one or more processors can be in communication with the one or more non-volatile storage units in the storage system, peripherals and/or communication interfaces.

BRIEF DESCRIPTION OF THE DRAWINGS

FIGS. 8A-8C are block diagrams of a system depicting the replacement of an existing memory card with a new memory card where the existing memory card was bound to a SIM card prior to being replaced.

DETAILED DESCRIPTION

Figure 1A:
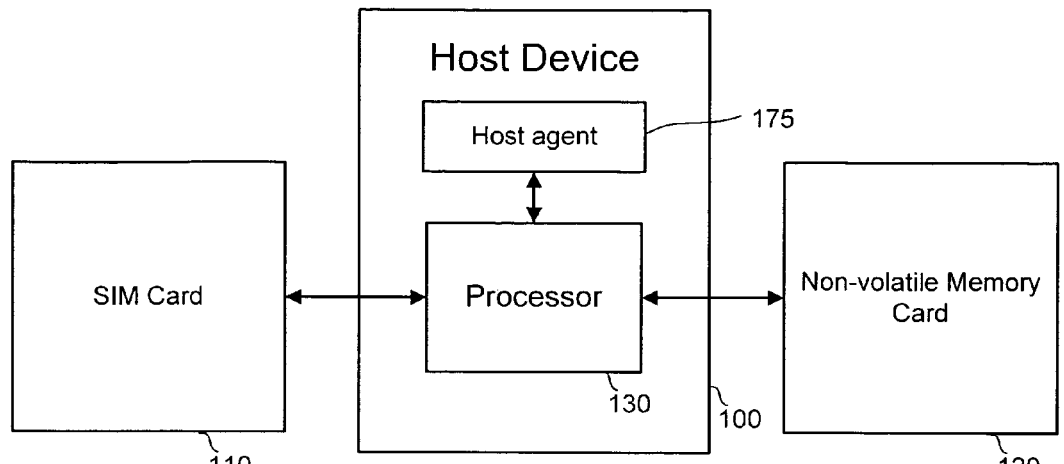
FIG. 1A is a block diagram of two memory devices in communication with a host device.

The disclosed technology provides a secure upgrade from an existing memory device to a new memory device. The existing memory device can include any type of non-volatile storage device, such as a Subscriber Identity Module (SIM) card or a removable memory card. The existing memory device is operatively coupled to a host device and is typically operated through a host agent on the host device. The host device may be any electronic device, such as a cellular telephone, digital camera, mobile media player, personal digital assistant, mobile computing device or non-mobile computing device. The existing memory device can be removable from or embedded within the host device. Additionally, the existing memory device may be operated through, while not being inside, the host device.

Before the upgrade process, the existing memory device may be associated with a third memory device that is also operatively coupled to the host device through the host agent. The third memory device may also be any type of non-volatile storage device. The third memory device may be an embedded memory device, a removable memory device, or a memory device operated through but not within the host device. In one embodiment, the existing memory device and the new memory device may be non-volatile memory cards while the third memory device may be a SIM card. In another embodiment, the existing memory device and the new memory device may be SIM cards while the third memory device is a non-volatile memory card. The host agent may be any software entity on the host device that is used to operate the memory devices through the host device, such as an application installed on the host device. The host agent allows access to the memory devices and controls the upgrade for the memory devices. Various processes are described herein as being performed by software entities such as host agents, applets, etc. for the sake of clarity, simplicity and to conform with the standard usage of these terms in the art. It will be appreciated that reference to software entities performing actions may include the performance of the actions by one or more devices (e.g., processors, control circuitry, etc.) under the control of the software entities.

To increase security, the existing memory device and the third memory device implement security features for accessing content on the devices. The existing memory device is bound to the third memory device, and access to content is dependent upon how the devices are bound together. For example, content on a memory card can include a binding type that is used to obtain a credential from a SIM card for accessing the content.

When an upgrade of the existing memory device is requested, at least a portion of the content of the existing device is sent to the new memory device. If the host device can accept or access both the existing and new memory devices simultaneously, the content can be sent directly from the existing memory device to the new memory device. If the host device can only accept or access one of the cards at a time, the content of the existing device can first be sent to a server. The server can be operated by a network service provider for the host device, such as a mobile network operator (MNO), or by any third-party. In one embodiment, the server is a trusted third-party (TTP) server. Although exemplary embodiments are presented with respect to a TTP server, any type of server can be used with the disclosed technology. The content of the existing memory device is sent to the TTP by the host agent on the host device. Once the host agent sends the content from the existing memory device to the TTP, the host agent can request that the new memory device be inserted in the host device. When the new memory device is inserted, the host agent requests the content from the TTP and sends it to the new memory device.

Memory Device Binding

FIG. 1A depicts one example of memory devices that are bound to each other and are operated through a host agent 175 on a host device 100. As described above, the host device 100 can be any electronic device. The host device 100 contains a processor 130. The processor 130 can be any type of processor used to operate the host device 100. The processor 130 is used to access SIM card 110 and non-volatile memory card 120 through the host device 100. In one embodiment, the processor 130 executes the functions of the host agent 175 for SIM card 110 and non-volatile memory card 120.

Figure 1B:
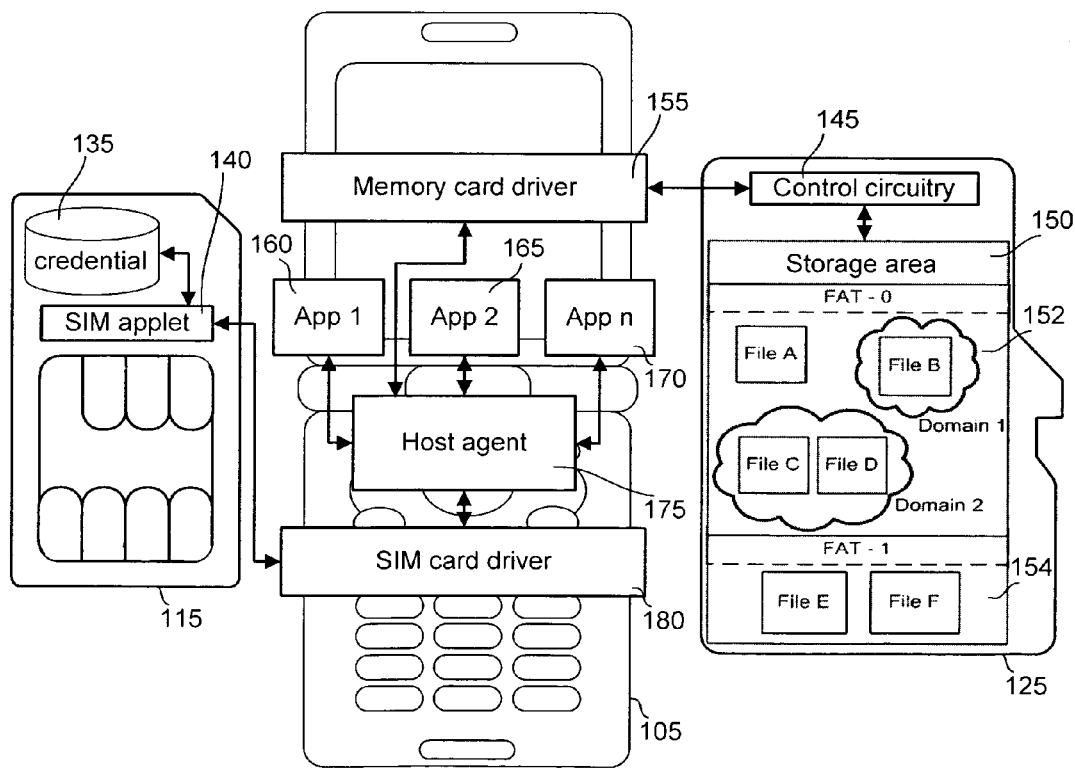
FIG. 1B is a block diagram of two memory devices in communication with a handset host device.

FIG. 1B depicts one example of the system shown in FIG. 1A. In FIG. 1B, the host device 100 is a handset 105, such as a mobile telephone or other computing device. The first memory device is a SIM card 115, and the second memory device is a removable memory card 125. The handset 105 includes a processor (not shown) as described in FIG. 1A to execute memory card driver 155, application 1 160, application 2 165, application n 170, host agent 175, and SIM card driver 180 contained on the handset 105. For simplicity, much of the disclosure references the example shown in FIG. 1B. However, the disclosed technology is not so limited.

The handset 105 has an International Mobile Equipment Identity (IMEI) number used as a unique identifier. The host agent 175 receives requests to access content on the memory card 125 and authenticates the entity attempting to access content before allowing that content to be accessed. The entity attempting to access content can be a user of the handset 105. The user may also attempt to access the content through application 1 160, application 2 165, or application n 170. These applications are also entities that may be subject to authentication before access is allowed. Application 1 160, application 2 165, or application n 170 can be any type of application, such as a media player for playing music or video files, a word processor, a calendar, etc.

The handset 105 contains a memory card driver 155 that allows the memory card 125 to be accessed through the handset 105. The handset 105 also contains a SIM card driver 180 that allows the SIM card 115 to be accessed through the handset 105.

The memory card 125 contains a storage area 150 and control circuitry 145. The storage area 150 contains the content that is stored on the memory card 125. The content is accessed through the control circuitry 145, which controls the reading and writing of content to the memory card 125. The memory card 125 also has a unique card identifier (CID) that identifies that particular memory card.

The storage area 150 can be divided into any number of public or secure partitions. Access to content in a secure partition requires valid authentication from an authorized entity. Content in a public partition can include clear content, which does not require authentication and may be accessed by any entity, and protected content, which requires authentication in order to be accessed. In the example shown in FIG. 1B, the storage area 150 is divided into two partitions: partition 152 and partition 154. Each partition has a File Allocation Table (FAT) which contains information about where each file is stored within the partition. FAT-0 contains information about the content stored in partition 152, and FAT-1 contains information for partition 154.

Partition 152 is one example of a secure partition. Secure partitions are hidden partitions that are undetectable to a user or a host device. Any entity attempting to access content within a secure partition must first be authenticated using the host agent 175 on the handset 105. The entity may be a user, an application on the handset 105, or a user attempting to access the content through an application on the handset 105. When an entity attempts to access content in a secure partition, the host agent 175 first accesses the file header of the content. The file header of each file is stored with the file itself and contains information about the content, such as content metadata, which may indicate what type of content is stored, information related to encrypting and decrypting the content, and information related to authentication, such as a binding type. More information about the authentication process can be found in U.S. patent application Ser. No. 12/124,450, entitled "Authentication for Access to Software Development Kit for a Peripheral Device," by Mei Yan et al., filed May 21, 2008, which is incorporated by reference herein in its entirety.

After successful authentication, the entity attempting to access the content is logged into the memory card 125 and can access content within partition 152, such as File A and logic groups Domain 1 and Domain 2. Logic groups are content groupings protected by individualized encryptions. Logic groups Domain 1 and Domain 2 are each protected by a content encryption key (CEK). All content stored within Domain 1, such as File B, is encrypted using a particular CEK associated with Domain 1, and all content stored within Domain 2, such as File C and File D, is encrypted using another CEK associated with Domain 2. Information related to the CEK for each logic group is stored in the file header of the content in the logic group. That information may be used to access the correct CEK for decrypting the content if the authenticated entity has the proper authority to access the content. If the entity does not have authority such that the correct CEK can be accessed, they may be able to access files within Domain 1 or Domain 2, but will not be able to decrypt the contents thereof. The encryption and decryption of content is performed by the control circuitry 145, which may support any encryption method such as symmetric encryption (e.g., AES, DES, 3DES, etc.), cryptographic hash functions (e.g., SHA-1, etc.), asymmetric encryption (e.g., PK1, key pair generation, etc.), or any other cryptography methods.

Partition 154 is one example of a public partition containing clear content File E and File F. Public partitions are detectable to a user or a host device. Clear content is any content that is stored in a public partition of the memory device 125 and that is not encrypted with a CEK. Any entity attempting to access clear content within a public partition may do so without authentication.

Access to any content stored on the memory device 125 is controlled using the control circuitry 145. The control circuitry allows the host agent 175 on the handset 105 to access content on the memory device 125 after the host agent 175 has successfully authenticated the entity attempting to access the content.

The SIM card 115 in FIG. 1B can be any removable integrated circuit card as typically used in a cellular telephone or mobile computer. The SIM card 115 is a memory card that stores the International Mobile Subscriber Identity (IMSI), which is the identifier used to identify the subscriber of the mobile service for the handset 105. When a call is placed or data transfer initiated, the IMSI is sent from the SIM card 115 to the handset 105, and the handset 105 then sends the IMSI to the subscriber network. The subscriber network is the MNO that provides mobile service for the handset 105. When the MNO receives the IMSI from the handset 105, it allows a call to be placed or data to be transferred. The SIM card 115 also stores the Mobile Subscriber Integrated Services Digital Network (MSISDN) number, which is an identifier associated with the telephone number for the SIM card 115. The SIM card 115 is typically operated through one MNO. The MNO can be identified through a network identifier (NetID) that is unique to that particular MNO. The NetID can be any identifier for the MNO such as the Mobile Country Code (MCC) or the Mobile Network Code (MNC).

The SIM card 115 also stores applications within its memory, such as SIM applet 140. The SIM applet 140 is an application used with the host agent 175 on the handset 105 for authenticating and logging in an entity attempting to access content on the memory card 125. The SIM applet 140 will generate a credential 135 for access to content on the memory card 125 based on the binding type found in the file header for the corresponding content. Because the content on memory card 124 is bound to SIM card 115, the cards are bound together. The content on memory card 125 may include different binding types in the file headers for different portions of the content (e.g., different files).

Figure 2:
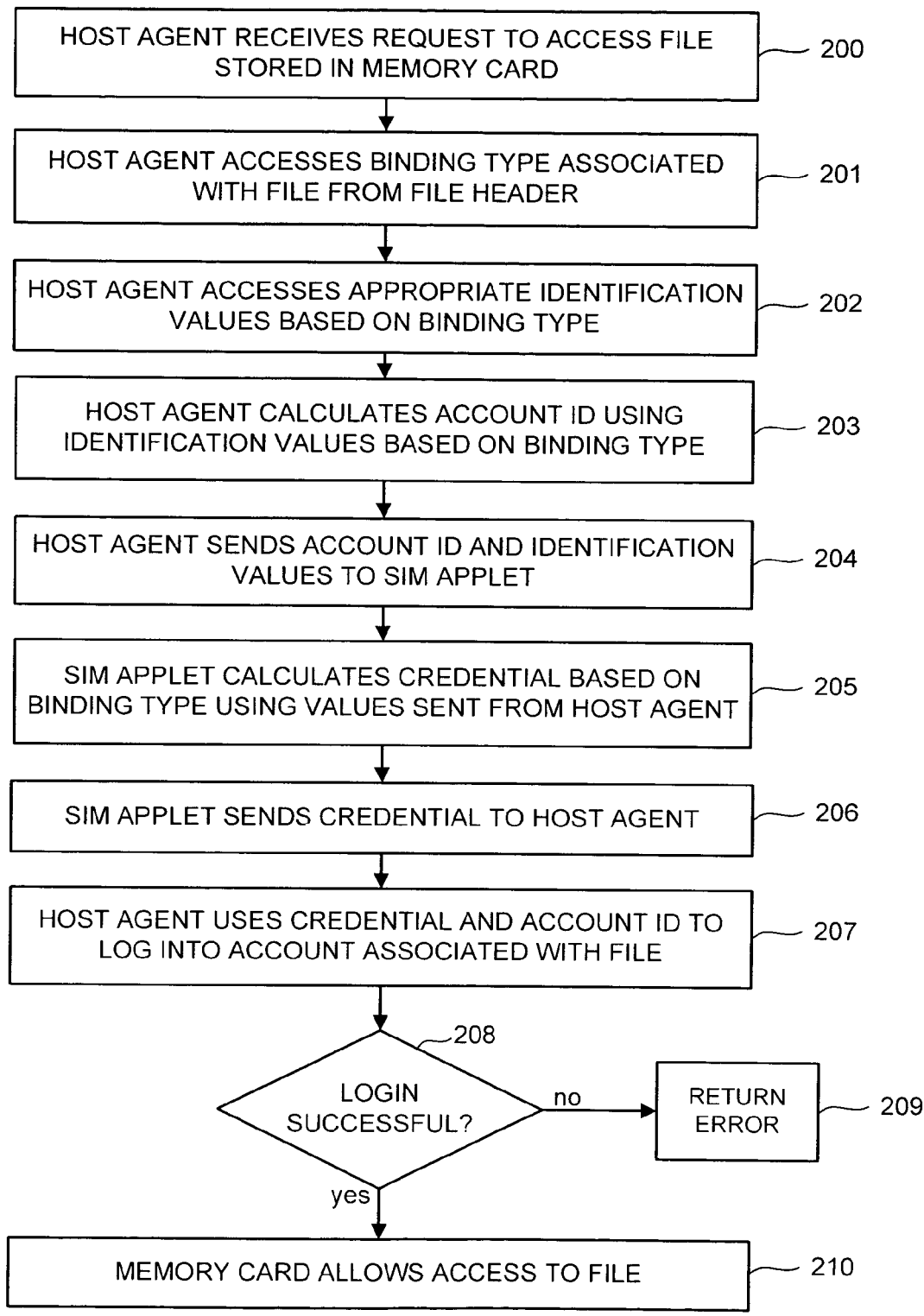
FIG. 2 is a flow chart of a process for accessing content on a memory device.

FIG. 2 is a flowchart of a process for authenticating and logging in an entity attempting to access protected content on the memory card 125. An entity attempting to access clear content in a public partition need not be authenticated for access to that content. In step 200, the host agent 175 receives a request to access a file stored in the memory card 125. In one embodiment, the request may come from a user of the handset 105. In another embodiment, the request may come from an application on the handset 105, such as application 1 160.

In step 201, the host agent 175 accesses the binding type associated with the requested content from the file header of the requested file. All protected content stored in the memory card 125 has a particular binding type associated with it. The binding type can be found in the file header for the content. The binding type indicates how the content in the memory card 125 is bound to the SIM card 115 by indicating that a particular identifier should be used by SIM card 115 to calculate the credential needed for access to the content. The memory card 125 can be bound to the SIM card 115 based on one or more binding types for the content stored in the memory card 125. For example, the binding type may indicate an identifier for the SIM card 115 (i.e. SIM card binding), the handset 105 (i.e. handset binding), the memory card 125 (i.e. memory card binding), or the MNO for the handset 105 (i.e. network binding). Different binding types may be specified in the file headers for different portions of the content.

Once the binding type has been determined from the file header of the requested file (step 201), the host agent 175 accesses the appropriate identification values based on the binding type in step 202. If the binding type is SIM card binding, the host agent 175 accesses the appropriate SIM card identification value from the SIM card 115. In one embodiment, the identification value for SIM card binding is the IMSI number. In another embodiment, the identification value for SIM card binding is the MSISDN number. If the binding type is handset binding, the host agent 175 accesses the appropriate handset identification value from the handset 105. In one embodiment, the identification value for handset binding is the IMEI number. If the binding type is memory card binding, the host agent 175 accesses the appropriate memory card identification value from the memory card 125. In one embodiment, the identification value for memory card binding is the CID. If the binding type is network binding, the host agent 175 accesses the appropriate network identification value from the MNO using the telecommunication capabilities of the handset 105. In one embodiment, the identification value for network binding is the NetID.

After the host agent 175 accesses the appropriate identification value based on the binding type of the requested content, the host agent 175 uses that identification value to calculate an account identifier based on the binding type (step 203). The host agent 175 accesses binding rules in order to calculate the account identifier. The binding rules are typically stored on SIM card 115, but can also be stored at the host agent 175, or with the content. The binding rules may indicate a particular algorithm for the calculation and can be specific to each binding type or they can be the same for any of the binding types. The account identifier can be calculated by inputting the identification value (and other values that may optionally be specified by the binding rules) in the particular algorithm associated with the binding rules. In one embodiment, the particular algorithm is a cryptographic function. Cryptographic functions are functions that input one or more values and return another value, wherein the other value serves as a representation or fingerprint of the one or more inputted values. Any cryptography method can be used, including by way of non-limiting example, symmetric encryption (e.g., AES, DES, 3DES, etc.), cryptographic hash functions (e.g., SHA-1, etc.), or asymmetric encryption (e.g., PK1, key pair generation, etc.).

The host agent 175 sends the account identifier calculated in step 203 and the identification values accessed in step 202 to the SIM applet 140 in the SIM card 115 (step 204). The SIM applet then uses either or both the account identifier and the identification values to calculate a credential 135 based on the binding type (step 205). The binding rules for the binding type indicate how the credential is calculated, specifying for example, that a particular algorithm, such as a cryptographic function, is to be used. The SIM applet 140 calculates the credential 135 using the account identifier and the optional identification values in the algorithm specified by the binding rules. The SIM applet 140 will save the calculated credential 135 in the SIM card 115 memory.

Once the credential 135 is calculated by the SIM applet 140, the SIM applet 140 sends the credential to the host agent 175 (step 206). The host agent 175 uses the credential 135 received in step 206 and the account identifier calculated in step 203 to log in to an account that is associated with the requested file (step 207). Each protected file in the memory card 125 is associated with permissions that indicate which entities are allowed to access that file by indicating the account identifiers that are allowed to access the file. In step 208, the control circuitry 145 determines whether the account associated with the account identifier may access the content and whether the credential 135 is valid for that account. If the account identifier and the credential 135 are not valid, access is denied. The host agent receives the login status from the control circuitry and returns an error to the entity requesting the content (step 209). If the account identifier 175 and the credential 135 are valid, the host agent 175 allows access to the requested file (step 210).

Figure 3:
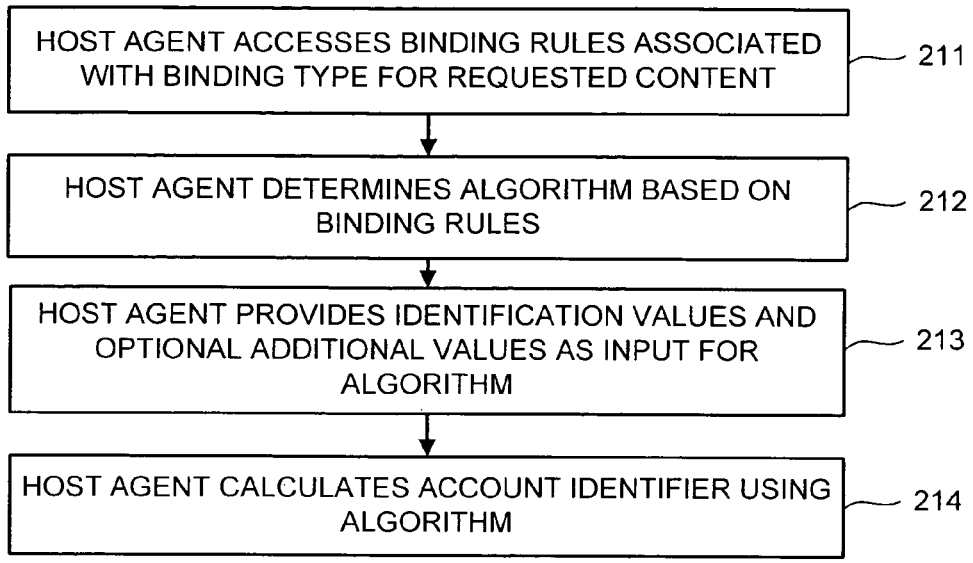
FIG. 3 is a flow chart of a process for calculating an account identifier.

FIG. 3 is a flow chart of a process for calculating the account identifier, as described in step 203 of FIG. 2. In step 211, the host agent 175 accesses the binding rules associated with the binding type for the requested content. The host agent 175 determines the algorithm to use for the calculation of the account identifier (step 212). The algorithm is specified by the binding rules. The host agent 175 provides the identification values accessed in step 202 of FIG. 2 as the input for the algorithm (step 213). In one embodiment, additional values may be used for the input as well, as specified by the binding rules. The host agent 175 calculates the account identifier by executing the algorithm with the inputs (step 214).

Figure 4:
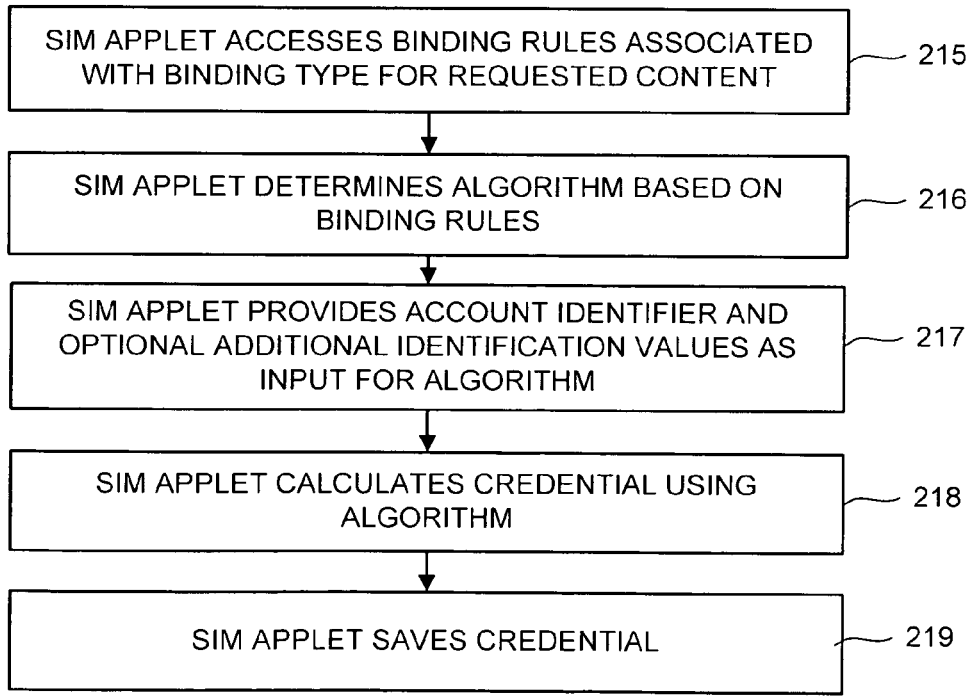
FIG. 4 is a flow chart of a process for calculating a credential.

FIG. 4 is a flow chart of a process for calculating the credential 135, as described in step 205 of FIG. 2. In step 215, the SIM applet 140 accesses the binding rules associated with the binding type for the requested content. The SIM applet 140 determines the algorithm to use for the calculation of the credential 135 (step 216). The algorithm is specified by the binding rules. The SIM applet 140 provides the account identifier as the input for the algorithm (step 217). In one embodiment, additional identification values may be used for the input as well, as specified by the binding rules. The SIM applet 140 calculates the credential 135 by executing the algorithm with the inputs (step 218). The SIM applet 140 also saves the credential 135 in the SIM card 115 (step 219).

SIM Card Replacement in Bound Device Arrangement

Figure 5A:
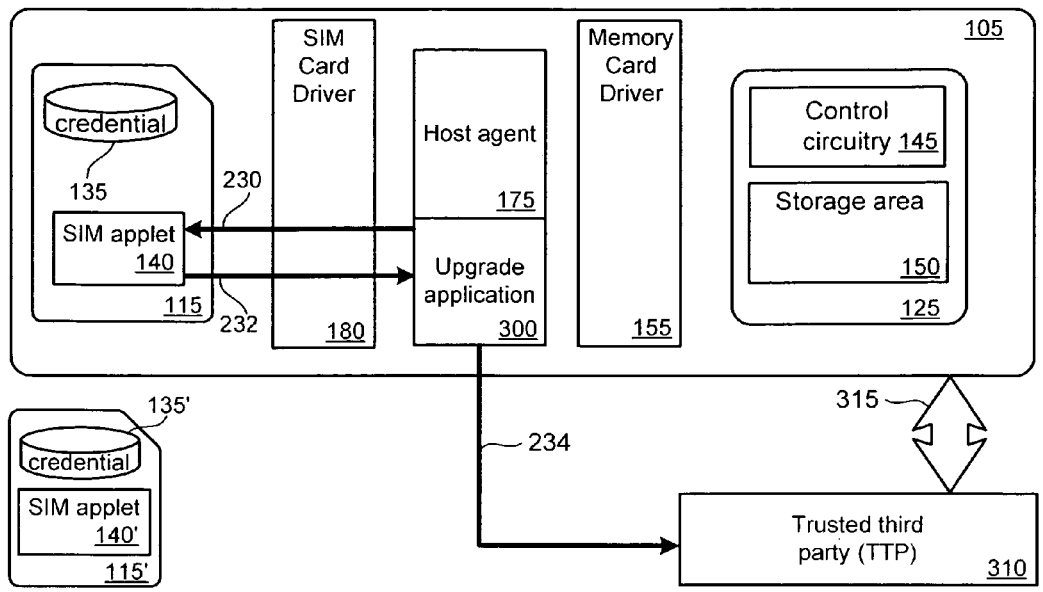
FIGS. 5A-5B are block diagrams of a system depicting the replacement of an existing subscriber identity module (SIM) card with a new SIM card where the existing SIM card was bound to a non-volatile memory card prior to being replaced.
Figure 5B:
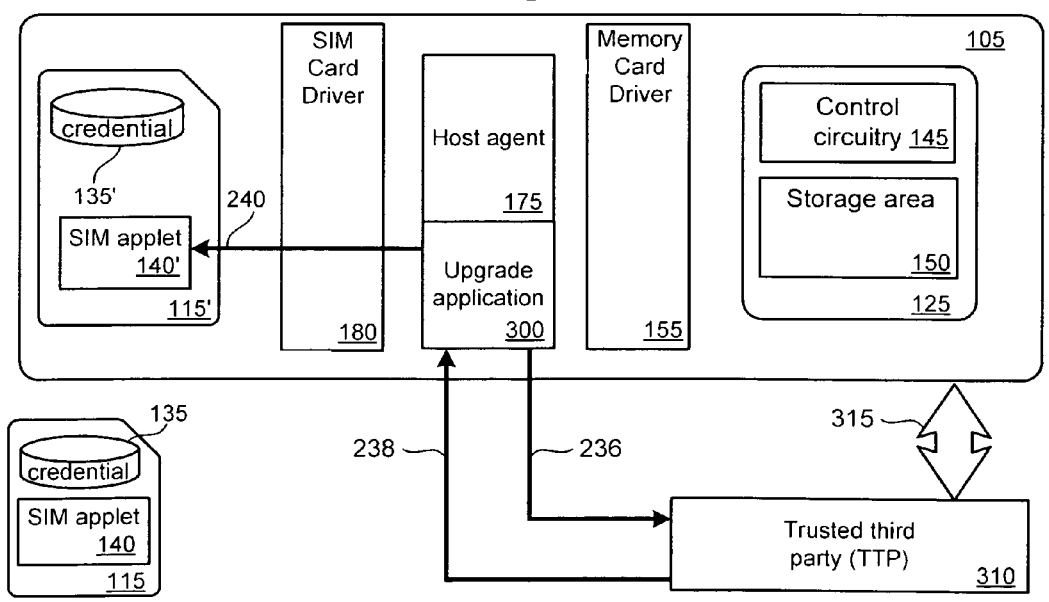

FIGS. 5A-5B depict a block diagram of one system used to upgrade an existing SIM card 115 that provides security features for accessing content on non-volatile memory card 125. An upgrade application 300 within the host agent 175 is used to facilitate the upgrade of the existing SIM card 115 to a new SIM card 115' through the memory card driver 155 and the SIM card driver 180. An exemplary flow of data and commands between the various components is illustrated by the arrows in FIGS. 5A-5B.

In FIG. 5A, SIM card 115 and non-volatile memory card 125 are operatively coupled to handset 105. Upgrade application 300 receives a request to replace the existing SIM card 115 with a new SIM card 115'. SIM card 115' is depicted apart from handset 105 to illustrate that it is not yet operatively coupled with the handset. When the request to upgrade the SIM card 115 is received by the upgrade application 300 in the host agent 175, the upgrade application 300 requests the credentials 135 stored in the existing SIM card from the SIM applet 140 as represented by arrow 230. The SIM applet 140 sends the credentials 135 to the upgrade application 300 on the host agent 175 as represented by arrow 232. The upgrade application 300 will then send the credentials 135 to the TTP 310 through the secure channel 315 as represented by arrow 234.

The secure channel 315 facilitates the transmission of data between the host agent 175 and the TTP 310. The data can be sent through the secure channel 315 over-the-air (OTA) using the handset 105 telecommunication capabilities. The data may also be sent using the secure channel 315 through the internet or other network. Additionally, the data sent from the host agent 175 to the TTP 310 through the secure channel 315 is encrypted by the host agent 175 before it is sent to the TTP 310. The content can then be decrypted when it is received at the TTP 310. When data is sent from the TTP 310 to the host agent 175 through the secure channel 315, the data is similarly encrypted before it is sent to the handset 105 for the new storage unit and then decrypted once it is received at the host agent 175.

Once the TTP 310 receives the credential from the upgrade application 300 in the host agent 175 through the secure channel 315, the existing SIM card can be removed from the handset 105 and the new SIM card can be inserted. In one embodiment, upgrade application 300 provides an indication to the user to remove the existing SIM card and insert the new one. The upgrade application 300 on the host agent 175 can be invoked after the new SIM card is inserted in the handset 105 and the handset is powered on. FIG. 5B depicts the system after removing the existing SIM card 115 and inserting the new SIM card 115'. The upgrade application 300 then requests the credentials from the TTP 310 through the secure channel 315 as represented by arrow 236. The upgrade application 300 receives the credentials as represented by arrow 238 and sends the received credentials to the SIM applet of the new SIM card as represented by arrow 240. The SIM applet saves the credentials in the new SIM card.

Figure 6:
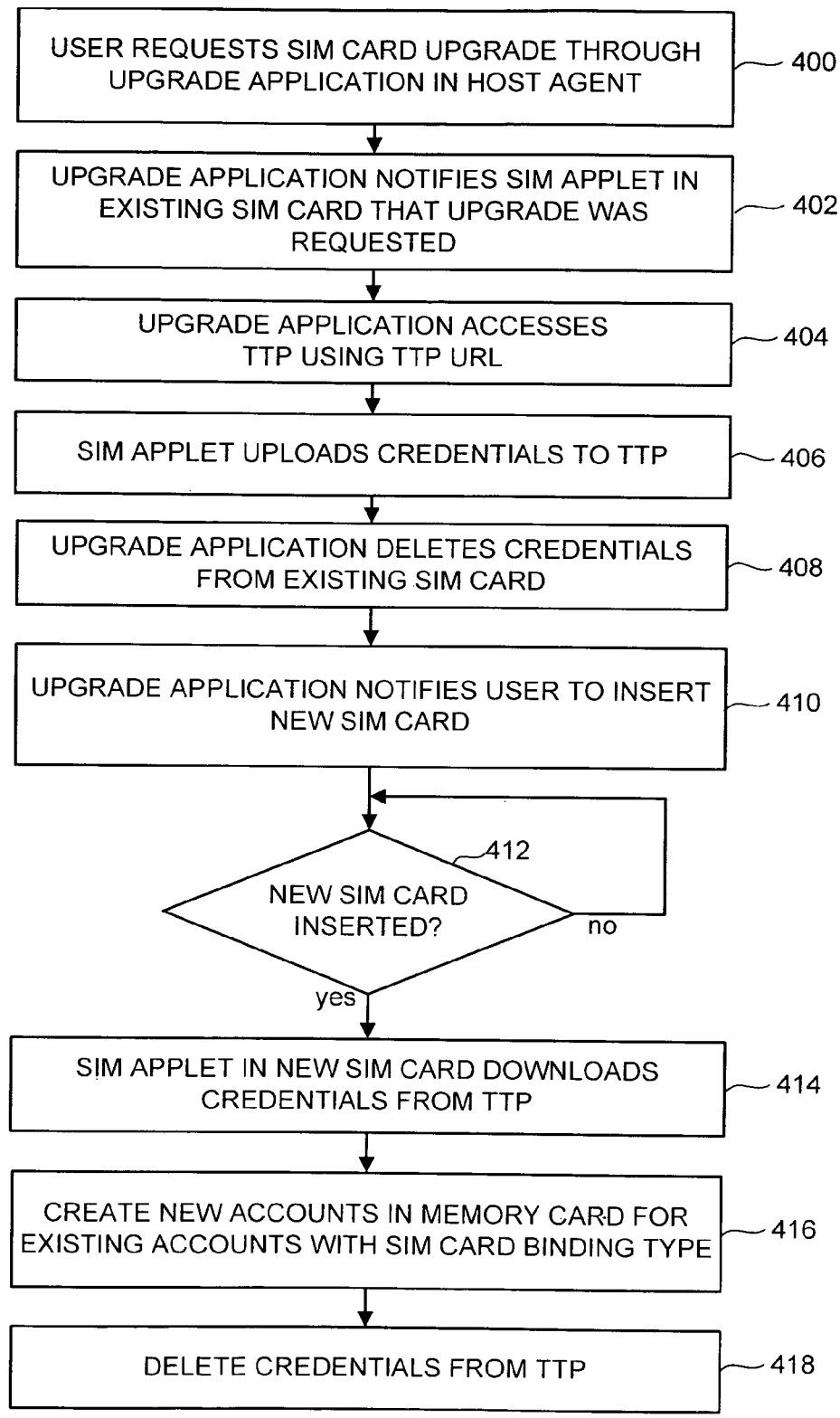
FIG. 6 is a flow chart of a process for replacing an existing SIM card with a new SIM card where the existing SIM card was bound to a non-volatile memory card prior to being replaced

FIG. 6 is a flow chart of one embodiment for upgrading a SIM card 115. In step 400, a user or other entity requests that the existing SIM card be upgraded. In one embodiment, the user can request the SIM card upgrade through the upgrade application 300 on the host agent 175. In step 402, the upgrade application 300 notifies the SIM applet 140 in the existing SIM card that an upgrade request was received. This allows the SIM applet 140 to prepare the credentials for the upgrade process.

In step 404, the upgrade application 300 accesses the TTP 310 using an address for the TTP 310. In one embodiment, the address is a uniform resource locator (URL) for the TTP 310 location.

Once the TTP 310 is located and accessed, the SIM applet 140 on the existing SIM card can upload the saved credentials 135 to the TTP 310 through the upgrade application 300 (step 406). The credentials 135 are uploaded to the TTP 310 through the secure channel 315 created by the upgrade application 300.

Once the credentials 135 are successfully uploaded to the TTP 310, the upgrade application 300 deletes the credentials from the existing SIM card (step 408). The upgrade application 300 then notifies the user to insert the new SIM card into the handset 105 (step 410).

The upgrade application 300 determines whether the new SIM card is inserted (step 412). Once the upgrade application 300 determines that the new SIM card has been inserted, the upgrade application 300 notifies the SIM applet 140 of the new SIM card to prepare to receive the credentials 135 saved at the TTP 310. In step 414, the SIM applet 140 of the new SIM card downloads the credentials 135 from the TTP 310 through the upgrade application 300. The credentials 135 are sent from the TTP 310 to the SIM applet 140 using the secure channel 315. The SIM applet 140 saves the credentials 135 in the memory for the new SIM card.

For any content in the memory card 125 having a binding type that indicates SIM card binding, the accounts associated with that content can be modified. Those accounts on the memory card 125 as well as the credentials associated with those accounts on the new SIM card can be modified. The existing accounts for content having a SIM card binding type are associated with account identifiers and credentials that were calculated based on an identifier for the existing SIM card. The new accounts are created so that the content having a SIM card binding type will be bound to the new SIM card. New account identifiers and credentials can be calculated. This ensures that the content with a SIM card binding type can be accessed using the new SIM card. In step 416, new accounts are created in the memory card 125 for all of the existing accounts that had a SIM card binding type.

Once the new accounts are created, the upgrade application 300 notifies the TTP 310 to delete the credentials 135 that were saved on the TTP 310, and the upgrade process for the SIM card 115 is completed (step 418).

Figure 7:
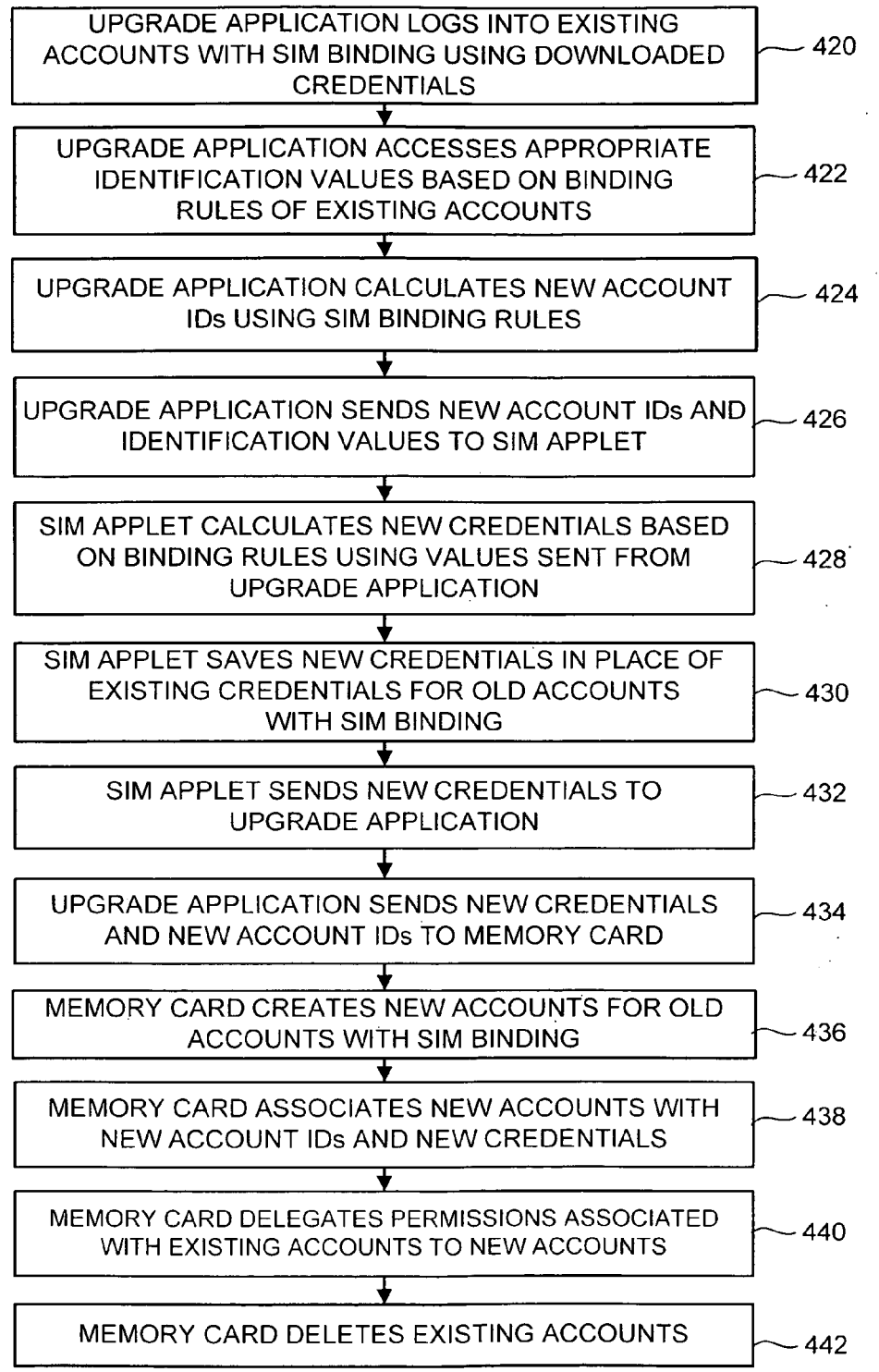
FIG. 7 is a flow chart of a process for creating new accounts in a SIM card.

FIG. 7 describes how the step of creating new accounts is performed (step 416 of FIG. 6). In step 420, the upgrade application 300 logs in to the existing accounts associated with a SIM card binding type. The upgrade application 300 uses the credentials saved at the TTP 310 to log in to the existing accounts.

In step 422, the upgrade application 300 accesses the appropriate identification values that are needed to calculate the account identifier for the accounts having a SIM card binding type based on the binding rules of the existing accounts. This includes accessing an identification value for the new SIM card, such as the IMSI number or the MSISDN number for example.

After the appropriate identification values have been accessed, the upgrade application 300 directs the host agent 175 to calculate new account identifiers for all of the existing accounts using the accessed identification values for the SIM card binding (step 424). The upgrade application 300 sends the new account identifiers and the identification values to the SIM applet 140 in the new SIM card (step 426). In step 428, the SIM applet 140 generates new credentials for each account identifier received in a manner similar to that described for step 205 of FIG. 2. The new credentials are calculated based on the SIM card binding rules. The SIM applet 140 saves the new credentials in the new SIM card in place of the existing credentials associated with the existing accounts (step 430). The existing credentials calculated using an identifier for the existing SIM card can be deleted. The SIM applet 140 sends the new credentials to the upgrade application 300 on the host agent 175 (step 432).

The upgrade application 300 sends the newly calculated credentials to the control circuitry 145 of the memory card 125 (step 434) to initiate the creation of new accounts for all of the existing accounts in the memory card 125 having SIM card binding. The memory card 125 creates new accounts for all of the existing accounts with SIM binding (step 436) and associates the new accounts with the corresponding account identifiers and credentials calculated for the new SIM card (step 438). The permissions associated with the existing accounts are delegated to the new accounts (step 440) so that the new accounts are able to access the appropriate content. Once the new accounts are successfully created in the memory card 125, the existing accounts with a SIM card binding type can be deleted from the memory card 125 (step 442).

Non-Volatile Memory Card Replacement in Bound Device Arrangement

Figure 9:
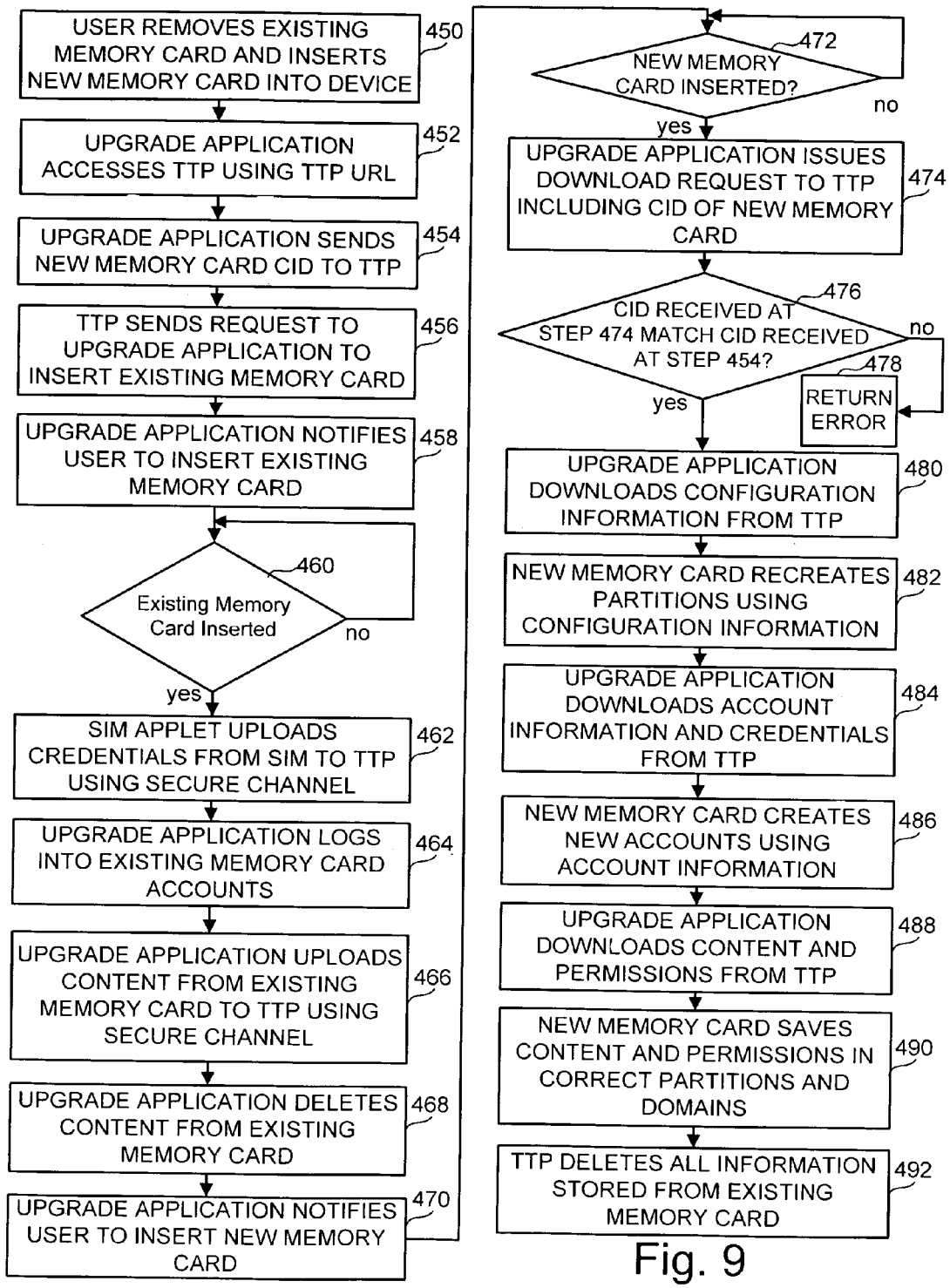
FIG. 9 is a flow chart of a process for replacing an existing memory card with a new memory card where the existing memory card was bound to a SIM card prior to being replaced.

FIGS. 8A-8C are block diagrams of a system depicting the upgrade of a non-volatile memory card 125 having content that is accessed using a credential stored or calculated at SIM card 115. An exemplary flow of data and commands between the various components is illustrated by the arrows in FIGS. 8A-8C. FIG. 9 is a corresponding flow chart describing one process for upgrading the memory card 125. FIGS. 8A-8C and 9 will be described in conjunction with one another. FIG. 8A depicts the system after a user has removed the existing non-volatile memory card 125 and inserted a new non-volatile memory card 125' to begin the upgrade process at step 450 of FIG. 9. When the new memory card 125' is inserted, the upgrade application 300 is notified and accesses the TTP 310 using an address for the TTP 310, such as a URL for example (step 452). At step 454, the upgrade application 300 sends the CID for the new memory card 125 to the TTP 310 as represented by arrow 250. Once the TTP 310 receives the CID for the new memory card 125, the TTP 310 sends a request at step 456 to the upgrade application 300 that the existing memory card should be inserted as represented by arrow 252. The upgrade application 300 notifies the user to insert the existing memory card (step 458).

The upgrade application 300 waits until the new memory card is removed and the existing memory card is inserted (step 460). In one embodiment, the handset 105 may be capable of operating multiple memory cards at one time, so the new memory card does not have to be removed from the handset 105 before the content from the existing memory device is sent to the TTP 310. In one embodiment, an upgrade can be requested explicitly instead of by removing an existing memory card and inserting a new memory card. FIG. 8B depicts the system after the new non-volatile memory card 125' has been removed and the existing memory card 125 has been reinserted.

Once the existing memory card 125 is inserted in the handset 105, the upgrade application 300 directs the SIM applet 140 to upload the credentials 135 on the SIM card 115 to the TTP 310 as represented by arrow 254. At step 462, the credentials 135 are received from the SIM applet as represented by arrow 256 and uploaded to the TTP 310 using the secure channel 315 as represented by arrow 258.

At step 464, the upgrade application 300 uses the credentials 135 to log into the existing memory card accounts on non-volatile memory card 125 as represented by arrow 260. Once the upgrade application 300 has logged into the existing memory card accounts, the upgrade application 300 receives the content from the existing memory card as represented by arrow 262. At step 466, the upgrade application uploads the content to the TTP 310 as represented by arrow 264. The content can include user data and other information stored in the existing memory card. The user data may include the protected or unprotected content or files and the clear content stored in the existing memory card. The other information from the existing memory card can include configuration information, account information, hidden partition, user data information, and any other information associated with the existing memory card. The configuration information indicates how the content is organized and stored within the existing memory card. The account information can be any information associated with the accounts in the existing memory card, such as the account identifier, the credentials associated with the account identifier, and the account hierarchy, for example. The account hierarchy provides information about which accounts have a greater access level relative to the other accounts. Additionally, an account can be created by another account, so the account hierarchy also indicates how the accounts were created. The hidden partition information may include the partition names and sizes for example. The user data information may include the permissions associated with the user data (e.g. CEK, rights objects for DRM, etc.). The upgrade application 300 may also provide to the TTP 310 any other information that the memory card 125 may store, such as the existing memory card CID for example.

Once the content from the existing memory card 125 has been successfully uploaded to the TTP 310 by the upgrade application 300, the upgrade application 300 deletes the content of the existing memory card at step 468 as represented by arrow 266.

The upgrade application 300 notifies the user to insert the new memory card once the information and content from the existing memory card have been successfully transferred to the TTP 310 and deleted from the existing memory card (step 470). The upgrade application 300 determines whether the new memory card has been inserted in the handset 105 (step 472). FIG. 8C depicts the system after the existing non-volatile memory card 125 has been removed and the new non-volatile memory card 125' has been inserted. When the new memory card has been inserted, the upgrade application 300 sends an upgrade or download request represented by arrow 268 at step 474 to the TTP for the content and configuration information previously uploaded from the existing memory card 125. The download request will include the CID of the new and existing memory card. At step 476, the TTP 310 checks if the CID received at step 474 from the upgrade application matches the new memory card's CID that was received at step 454. If the CID received at step 474 does not match the CID received at step 454, the TTP returns an error to the upgrade application 300 (step 478).

If the CIDs match, the upgrade application 300 downloads the configuration information for the partitions and accounts from the TTP 310 at step 480 as represented by arrow 270. At step 482, the upgrade application 300 directs the new memory card to recreate the partitions based on the configuration information as represented by arrow 272. At step 484, the upgrade application 300 then downloads the account information, such as the account identifiers, the credentials, and the permissions from the TTP 310 as represented by arrow 274. The upgrade application 300 directs the new memory card at step 486 to create new accounts based on the account information and credentials received from the TTP 310 as represented by arrow 276.

Once the new memory card has been configured and the new accounts have been created, the upgrade application 300 downloads the content including corresponding permissions (e.g. CEK, rights objects, etc.) from the TTP 310 at step 488 as represented by arrow 278. At step 490, the upgrade application 300 directs the new memory card to save the content and the permissions in the appropriate locations as represented by arrow 280. The upgrade application 300 also associates the content with the appropriate accounts. When the content is saved in the new memory card, the accounts for content that have a binding type associated with the memory card 125 are modified. Additionally, the credentials associated with that content are modified as well so that the content with a memory card binding type will be associated with the new memory card.

Once all of the content from the TTP 310 has been downloaded by the upgrade application 300 and saved to the new memory card 125', the upgrade application 300 directs the TTP 310 at step 492 to delete the content stored on the TTP 310 from the existing memory card 125 as represented by arrow 282.

Figure 10:
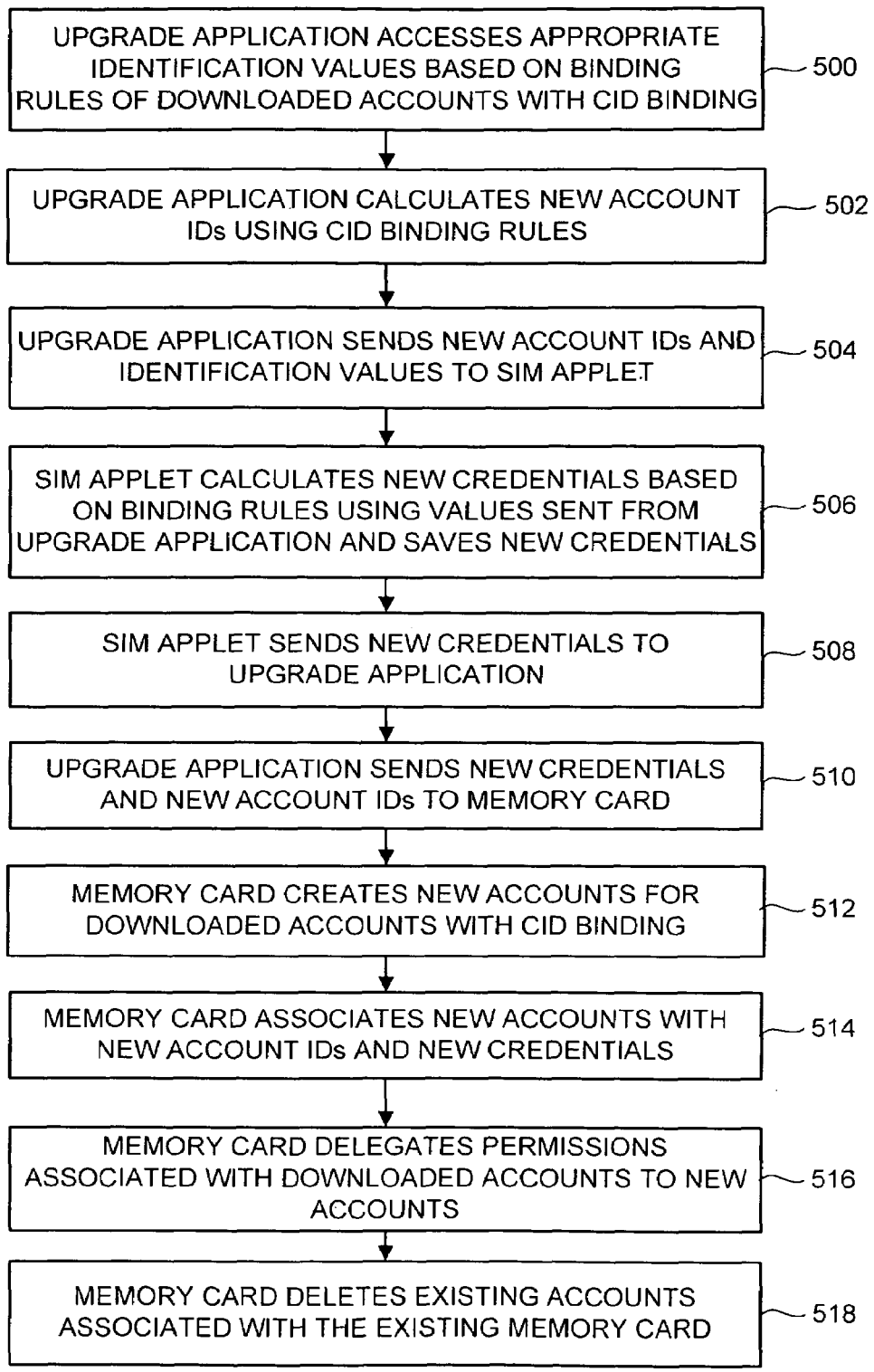
FIG. 10 is a flow chart of a process for saving content on a new memory card.

FIG. 10 describes one process for saving content on the new memory card (step 490 of FIG. 9). This process includes modifying the portion of the content that has a memory card binding type. Because that portion of the content has been associated with an account identifier and a credential that were calculated based on the CID for the existing memory card, that portion of the content should be modified so that it is associated with an account identifier and a credential that are calculated based on the CID for the new memory card. Additionally, a portion of the credentials in the SIM card 115 that were calculated based on the CID of the existing memory card should be modified so that the SIM card 15 stores new credentials calculated based on the CID for the new memory card.

In step 500 of FIG. 10, the upgrade application 300 accesses the appropriate identification values based on the memory card binding rules of the accounts downloaded from the TTP 310. These identification values may be the CID for the new memory card. The upgrade application 300 uses those identification values to calculate new account identifiers using the memory card binding rules for the accounts that have a memory card binding type (step 502). The upgrade application 300 sends the new account identifiers and the identification values to the SIM applet 140 on the new SIM card (step 504).

The SIM applet 140 uses the account identifiers and the identification values sent from the upgrade application 300 to calculate new credentials for the accounts having a memory card binding type (step 506). The SIM applet 140 also modifies the portion of the credentials associated with the existing memory card by saving the new credentials in the SIM card 115 and deleting the existing credentials for those accounts.

Once the new credentials are generated, the SIM applet 140 sends the new credentials to the upgrade application 300 (step 508). The upgrade application 300 then sends the new credentials and the new account identifiers to the new memory card to initiate the modification of the content having a memory card binding type (step 510).

The upgrade application 300 directs the new memory card to create new accounts for the existing accounts having a memory card binding type that were downloaded from the TTP 310 (step 512). The upgrade application 300 then directs the new memory card to associate the new accounts with the new account identifiers and the new credentials (step 514). The upgrade application 300 directs the new memory card to delegate the permissions for the existing accounts to the corresponding new accounts (step 516). Once the new accounts have been successfully created and associated with the new memory card, the existing accounts that were bound to the existing memory card are deleted from the new memory card (step 518).

Figure 11:
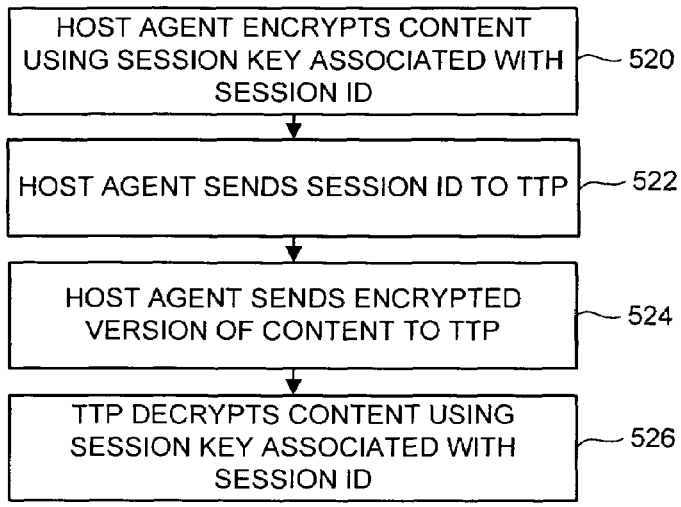
FIG. 11 is a flow chart of a process for creating a secure channel.

FIG. 11 describes one example of how a secure channel 315 is created for the transmission of data between the handset 105 and the TTP 310, such as transferring the credential in step 406 of FIG. 6 or transferring the content in step 466 of FIG. 9. When a secure channel 315 is created, the host agent 175 creates a session for transferring the data. The session is created by associating the session with a session ID, which is a unique identifier for the session that is created for the transfer. The session ID is associated with a session key, which is an encryption key used to encrypt the data. In step 520 of FIG. 11, the host agent 175 encrypts the content (e.g. credential, memory card content, etc.) using the session key associated with the session ID for the secure channel session. The host agent 175 sends the session ID to the TTP 310 (step 522). The TTP 310 has a record of which session keys are associated with which session IDs, so the TTP 310 is able to look up the session key that corresponds to the session ID sent by the host agent 175. The host agent 175 sends the encrypted version of the content to the TTP 310 (step 524). The TTP 310 can decrypt the content received from the host agent 175 using the session key associated with the session ID that was sent to the TTP 310 from the host agent 175 (step 526).

Figure 12:
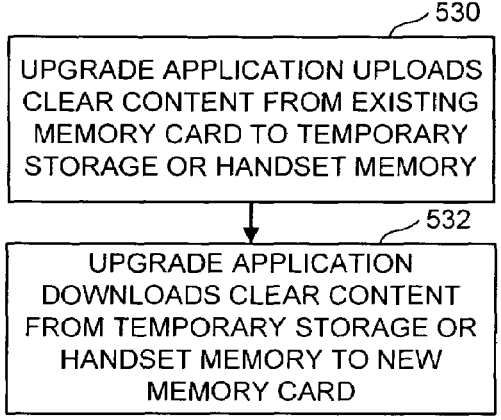
FIG. 12 is a flow chart of a process for transferring clear content on an existing memory card to a new memory card.

FIG. 12 describes one example of a process for transferring clear content (i.e. unprotected content in a public partition). Because clear content is openly accessible to any entity, the clear content is not associated with an account. Therefore, the steps in FIG. 9 and FIG. 10 may not be required for clear content. In step 530, the upgrade application 300 in the host agent 175 uploads the clear content from the existing memory card to temporary storage, for example, the TTP or a computing device or storage medium that is in communication with the existing memory card. In one embodiment, the host agent 175 can upload the clear content from the existing memory card to the handset 105 if the handset 105 has enough internal memory to serve as the temporary storage. In step 532, the upgrade application 300 downloads the clear content from the temporary storage to the new memory card once the temporary storage is in communication with the new memory card.

Figure 13:
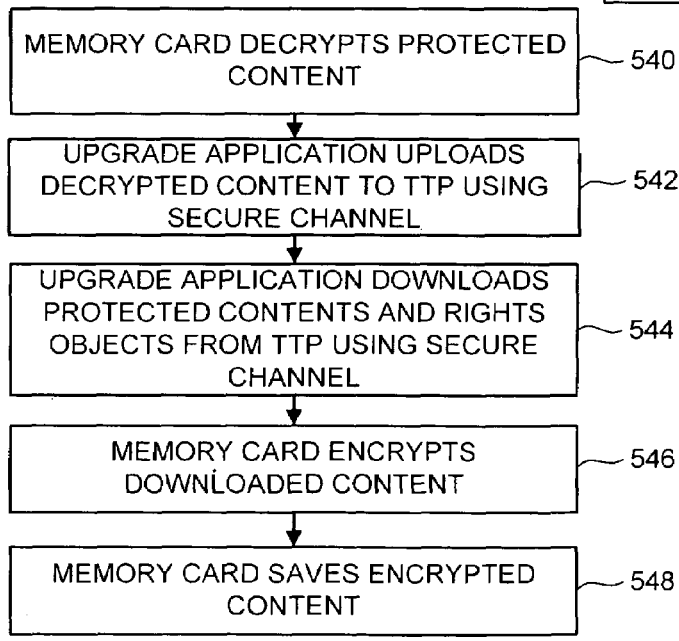
FIG. 13 is a flow chart of a process for transferring encrypted content on an existing memory card to a new memory card.

FIG. 13 describes one example of a process for encrypting and decrypting the protected content in the memory card using the CEK. When protected content is transferred from the existing memory card to the new memory card, the protected content in the existing memory card should be decrypted using the CEK before it is sent to the TTP 310 (step 540). This occurs when the upgrade application 300 logs into the existing memory card accounts in step 464 of FIG. 9. The CEK for the content is indicated by the permissions associated with the content.

Once the protected content is decrypted, the upgrade application 300 uploads the decrypted content to the TTP 310 using the secure channel 315 (step 542 and step 466 of FIG. 9). When the new memory card is ready to store the content from the existing memory card, the upgrade application 300 downloads the protected content, along with the rights objects associated with the protected content, from the TTP 310 using the secure channel 315 (step 544 and step 488 of FIG. 9). The upgrade application 300 sends the content to the new memory card and directs the new memory card to encrypt the protected content using the CEK (step 546). The new memory card saves the encrypted content in the correct locations (step 548 and step 490 of FIG. 9).

Accessing Memory Device Content Using a Network

Embodiments in accordance with the present disclosure may also be used to provide access to content on a first memory device that is bound to a second memory device, where the first memory device and second memory device are operatively coupled to different host devices. The first memory device may be any non-volatile storage device, such as a removable non-volatile flash memory card for example. The first memory device is operatively coupled to a first host device. The first memory device may be operated through a host agent on the first host device. The first host device may be any electronic device, such as a cellular telephone, digital camera, mobile media player, personal digital assistant, mobile computing device, non-mobile computing device, or any other device.

The second memory device is operatively coupled to a second host device through a host agent on the second host device. The second memory device may also be any non-volatile storage device, such as a Subscriber Identity Module (SIM) card for example. The first memory device is associated with the second memory device. In one embodiment, both memory devices can be operated through one host device using the host agent on one host device. The host agent may be any software entity on the host device and can be used to operate the memory devices through the host device, such as an application installed on the host device. The host agent allows access to the memory devices.

When access to content on the first memory device is requested, the host agent on the first host device calculates an account identifier associated with the requested content. The account identifier is sent to a server. The server can be operated by a network service provider for the host devices, such as a mobile network operator (MNO), or by any third-party. In one embodiment, the server is a trusted third-party (TTP) server. Throughout the description of the disclosed technology, the server will be referred to as a TTP. However, the technology is not limited to this embodiment, and any server can be used with the disclosed technology. Once the host agent sends the account identifier to the TTP, the TTP will send the account identifier to the second host device. The second memory device in the second host device will use the account identifier to calculate a credential. The credential is sent from the second host device to the server and then from the server to the host agent on the first host device. If the credential is valid, the card will allow applications on the device to access to the requested content. The card can return the login status to the host agent.

Figure 14:
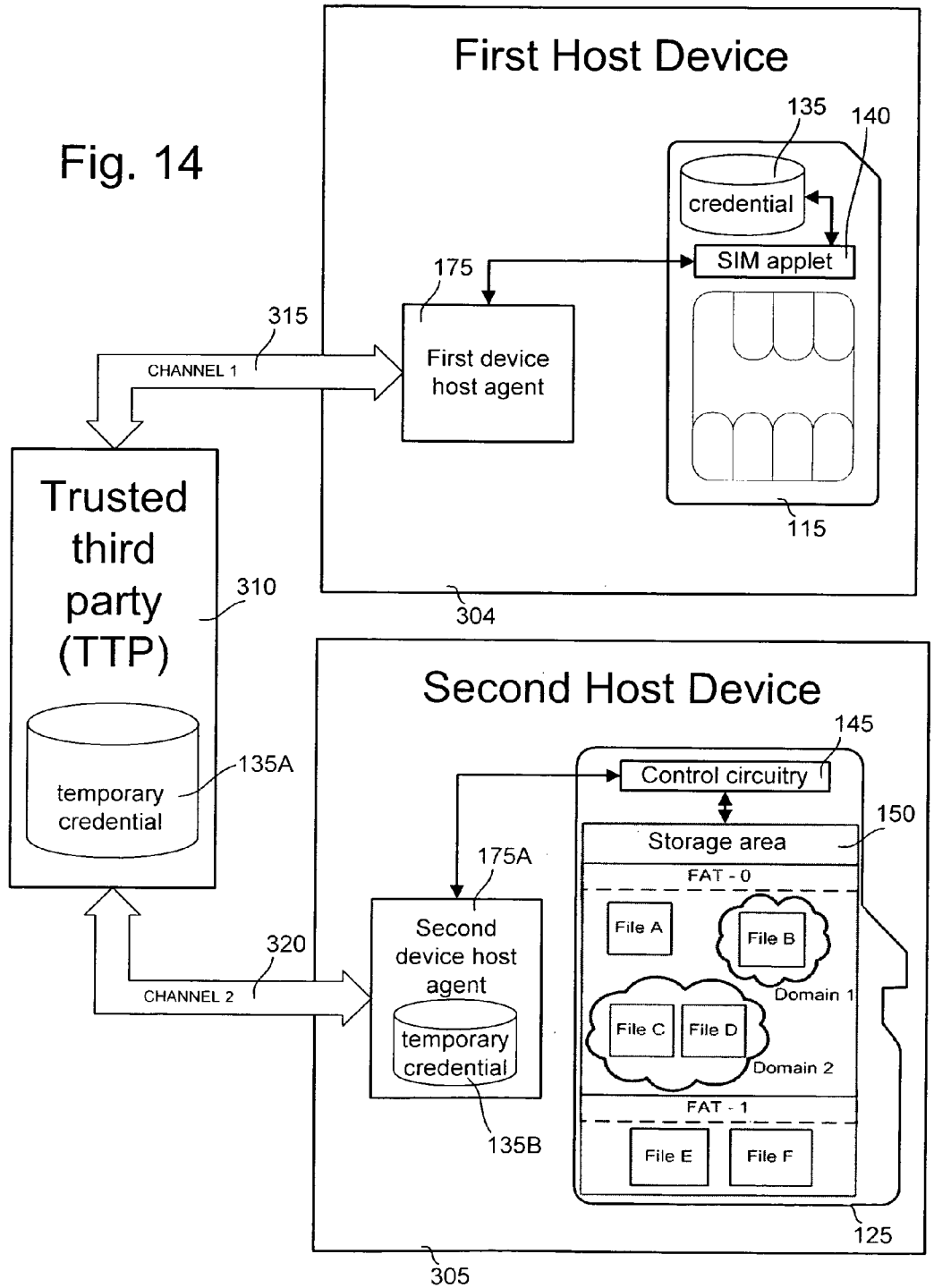
FIG. 14 is a block diagram of a device in communication with a trusted third-party server used for accessing a credential on a handset device.

As described in FIG. 2, access to content on the memory card 125 in the handset 105 requires a credential from the SIM card 115 in the handset 105. Typically, access occurs through one host device (e.g. handset 105). However, if a user operates the memory card 125 on a device other than the device on which the SIM card 115 operates, the credential should be accessed from the SIM card 115 on the handset 105. FIG. 14 depicts a block diagram of one system used to access content on a memory card in a first host device 304, wherein the memory card is bound to a SIM card operated in a second host device 305. The system includes the first host device 304, which operates the SIM card 115 using the first device host agent 175. A second host device 305 operates the memory card 125 through a second device host agent 175A on the second host device 305. The first and second host devices 304 and 305 may be any electronic device, such as a mobile telephone, a media player, a mobile computing device, a non-mobile computing device, a personal digital assistant, or any other device. The two devices need not be of the same type. The host agent 175A on the second host device 305 is similar to the host agent 175 on the first host device 304, both of which are as described in FIG. 2. A TTP 310 is used to access a credential 135 from the SIM card 115 on the first host device 304 so that the second host device 305 may use that credential 135 to access content on the memory card 125. The TTP 310 can be any server, such as a trusted third-party server for example. The second host device 305 communicates with the TTP 310 through channel 2 320. The handset 105 communicates with the TTP 310 using channel 1 315.

When an entity requests access to content on the memory card 125 through the host agent 175A on the second host device 305, the host agent 175A accesses the binding type associated with the requested content in the storage area 150 through the control circuitry 145 and calculates an account identifier based on the binding type, as described in FIG. 2.

Once the account identifier is calculated, the host agent 175A sends the account identifier to the TTP 310 through channel 2 320. Channel 2 320 is a secure channel that may transmit data over-the-air (OTA) using telecommunication capabilities of the second device 305 if the second device 305 is capable of doing so. Channel 2 320 may also transmit data through the internet or other network if the second device 305 is capable of accessing the internet or other network. A secure channel facilitates transmission of data that is encrypted before it is sent through the channel and decrypted after it is received through the channel to prevent another entity from acquiring the data during transmission through the channel. A secure channel is created by initiating a session for transmission. The session is assigned a session ID. Each session ID is associated with a session key, which is an encryption key used to encrypt the data to be transmitted. The session IDs and their corresponding session keys may be located in a reference table maintained by the host agent 175A. Before the account identifier is sent from the host agent 175A to the TTP 310, the host agent 175A opens a session by assigning a session ID to the session. The host agent 175A encrypts the account identifier using the session key associated with the session ID for that session. The host agent 175A sends the session ID to the TTP 310 and then transmits the encrypted account identifier to the TTP 310 through channel 2 320. The TTP 310, as well as the host agent 175, maintains a reference table for the session IDs similar to that maintained by the host agent 175A. The TTP 310 can use the session ID sent by the host agent 175A to decrypt the received account identifier using the session key associated with that session ID. The encryption and decryption of content for a secure channel is performed by the host agent 175A, host agent 175, or TTP 310, which may support any encryption method such as symmetric encryption e.g., AES, DES, 3DES, etc.), cryptographic hash functions (e.g., SHA-1, etc.), asymmetric encryption (e.g., PK1, key pair generation, etc.), or any other cryptography methods.

Once the TTP 310 receives the account identifier from the device host agent 175A, the TTP 310 sends the account identifier to the handset host agent 175 through channel 1 315. Channel 1 315 is also a secure channel which may transmit data OTA using the telecommunication capabilities of the handset 105. TTP 310 may decrypt the account identifier received from the second device 305 and re-encrypt for transmission to handset 105.

The handset host agent 175 directs the SIM applet 140 to calculate the credential 135 using the account identifier for the requested content. When the credential 135 is calculated, the host agent 175 sends the credential to the TTP 310 through secure channel 1 315.

Once the TTP 310 receives the credential 135 from the host agent 175, the TTP 310 stores a temporary credential 135A at the TTP for a limited amount of time. The temporary credential 135A is stored so that the second device 305 may access the content again during the limited amount of time by providing the account identifier to the TTP 310, and the TTP 310 will not have to request the credential 135 from the SIM card 115 on the first host device 304 again.

The TTP 310 sends the credential 135 to the host agent 175A on the second device 305 through secure channel 2 320. In one embodiment, the host agent 175A uses the credential 135 to access the content, as described in FIG. 2. The device host agent 175A also stores a temporary credential 135B for a limited amount of time as well so that the content may be accessed during the limited amount of time without having to recalculate another account identifier or credential 135. In one embodiment, the temporary credential 135B is stored by the device host agent 175A until the second device 305 is turned off.

Figure 15:
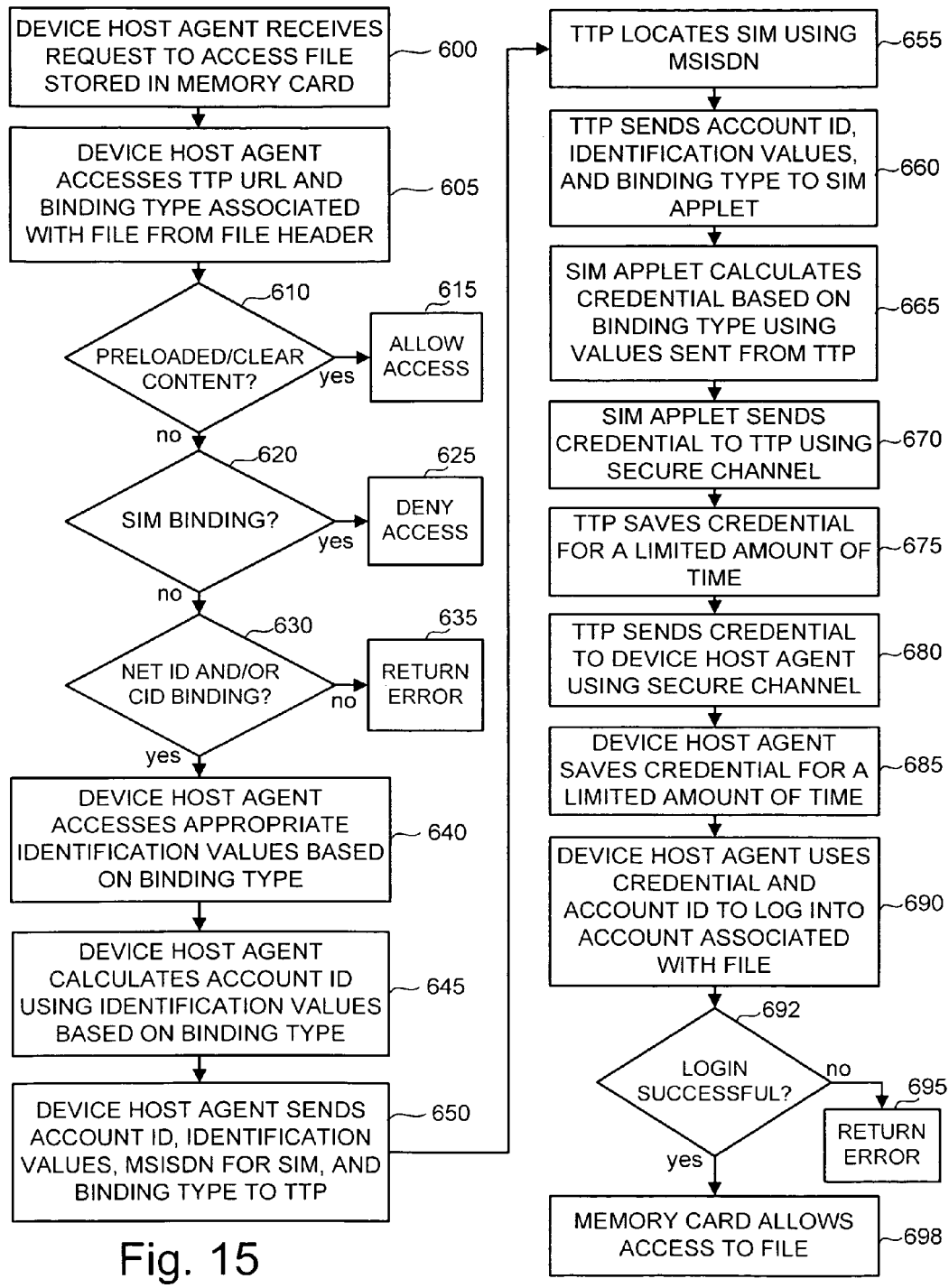
FIG. 15 is a flow chart of a process for accessing a credential for content through a network.

FIG. 15 is a flowchart of a process for accessing the content in a system similar to that shown in FIG. 14. In step 600, the device host agent 175A on the second device 305 receives a request to access a file in the storage area 150 of the memory card 125 on the second device 305. When this request is received, the device host agent 175A accesses the file header of the requested content through the control module 145 of the memory card 125. The file header stores the binding type for the content, the location of the TTP 310, such as a Universal Resource Locator (URL) for the location of the TTP 310 for example, as well as the MSISDN of the SIM card 115 that is bound to the memory card 125. The device host agent 175A may access the binding type associated with the content, the TTP 310 location, and the MSISDN in step 605.

In step 610, the device host agent 175A determines whether the requested content is preloaded or clear content.

Preloaded content is preloaded onto the memory card 125 by the memory card 125 manufacturer. Preloaded content may be unprotected content or protected content stored in a public partition of the memory card 125. Clear content may be unprotected content stored in a public partition of the memory card 125. If the host agent 175A determines that the requested content is preloaded content, the host agent 175A allows the requesting entity to access the content (step 615).

If the host agent 175A determines that the requested content is not preloaded or clear content, the host agent determines whether the binding type accessed in step 605 is SIM card binding (step 620). Typically, content that is bound to the SIM card 115 can only be accessed when the memory card 125 is operated with the SIM card 115 on the same device. If the requested content has a SIM card binding type, the host agent 175A denies access to the content (step 625).

If the requested content is not bound to the SIM card 15, the host agent 175A determines whether the requested content has either a NetID or a CID binding type (step 630). If the requested content is not bound to the MNO or to the memory card 125, the host agent 175A returns an error to the requesting entity (step 635). If the requested content is bound to the MNO or the memory card 125, the device host agent 175A accesses the appropriate identification values based on the binding type (step 640). For example, if the requested content is bound to the MNO, an identification value for the MNO (e.g. MCC, MNC) is accessed. If the requested content is bound to the memory card 125, an identification value for the memory card 125 (e.g. CID) is accessed.

In step 645, the device host agent 175A uses the accessed identification value to calculate an account identifier based on the binding type. The account identifier is calculated as described in step 215 of FIG. 2 and in FIG. 3. The device host agent 175A locates the TTP 310 using the TTP location accessed in step 605 and sends the account identifier, the identification values accessed in step 640, the MSISDN accessed in step 605, and the binding type accessed in step 605 to the TTP 310 through secure channel 2 320 (step 650). The device host agent 175A may use an API to send the information to the TTP 310 and request the credential 135. An example of the API may be a GetCredential command which contains the following parameters: CID, NetID (which may be "null" if the requested content is not bound to the MNO), MSISDN, and the account identifier. The host agent 175A may use this API command to transfer the data to the TTP 310 through secure channel 2 320 by assigning a session ID for the data. Additionally, the TTP 310 maintains a database that may store the information, such as the CID, NetID, MSISDN, the account identifier, etc.

The TTP 310 uses the MSISDN to locate the handset 105 with the SIM card 115 (step 655). Once the SIM card 115 is located, the TTP 310 sends the account identifier, the identification values (e.g. NetID, CID), and the binding type to the host agent 175 on the handset 105 through the secure channel 1 315, and the host agent 175 sends the information to the SIM applet 140 on the SIM card 115 (step 660). In step 665, the SIM applet 140 uses the received information to calculate the credential 135 based on the binding type of the requested content. The credential 135 is calculated as described in step 205 of FIG. 2 and in FIG. 4. After the credential 135 is calculated, the SIM applet 140 sends the credential 135 to the TTP 310 using secure channel 1 315 (step 670).

Once the TTP 310 receives the credential 135, the TTP 310 saves a temporary credential 135A for a limited amount of time (step 675). The temporary credential 135A is stored in the database that is maintained at the TTP 310. That is, the temporary credential 135A and the time the temporary credential 135A should be deleted from the TTP 310 is maintained in the database with the CID, NetID, MSISDN, and account identifier.

The TTP 310 sends the credential 135 to the device host agent 175A on the other device 305 using secure channel 2 320 (step 680). The device host agent 175A decrypts the received credential sent through the secure channel and saves a temporary credential 135B in the host agent 175A for a limited amount of time (step 685). After the limited amount of time, the device host agent 175A deletes the temporary credential 135B. The device host agent 175A uses the credential 135 and the account identifier to attempt to log in to the account associated with the requested content (step 690). The device host agent 175A determines whether the log in was successful (step 692). That is, the device host agent 175A determines whether the credential is valid for the account associated with the account identifier. If the credential is not valid, the device host agent 175A returns an error to the requesting entity (step 695). If the credential is valid, the device host agent 175A accesses the requested content from the memory card 125 (step 698).

Figure 16:
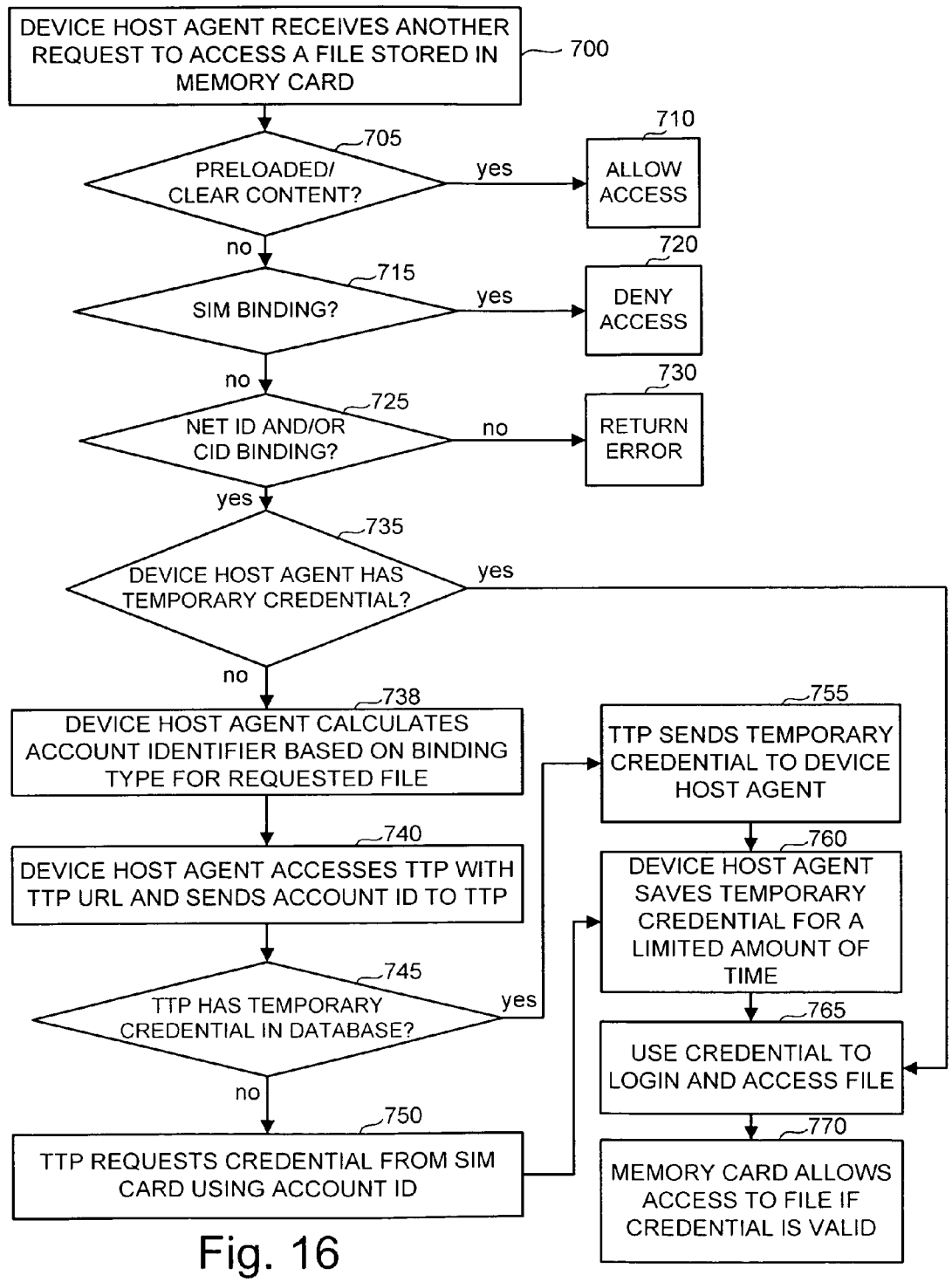
FIG. 16 is a flow chart of a process for accessing a credential for content.

FIG. 16 is a flowchart of a process for accessing other content in the memory card 125 on the second device 305 after a credential for that content has previously been requested. The previous request for content may be similar to that described in FIG. 15. In step 700 in FIG. 16, the device host agent 175A on the second device 305 receives another request to access a file stored in the memory card 125. The device host agent 175A determines whether the requested content is preloaded or clear content (step 705). If the requested content is preloaded or clear content, the device host agent 175A allows access to that content (step 710). If the requested content is not preloaded or clear content, the device host agent 175A determines whether the requested content has a SIM card binding type (step 715). If the requested content is bound to the SIM card 115, the device host agent 175A denies access to the requested content (step 720). If the requested content is not bound to the SIM card 115, the device host agent 175A determines whether the requested content is bound to the MNO or the memory card 125 (step 725). If the requested content is not bound to the MNO or the memory card 125, the device host agent 175A returns an error to the requesting entity (step 730).

If the device host agent 175A determines that the requested content is bound to the MNO or the memory card 125, the device host agent 175A determines whether the device host agent 175A already has a temporary credential 135B stored (step 735). If the device host agent 175A already has the temporary credential 135B, the device host agent 175A uses the temporary credential 135B to attempt to login and access the file (step 765). The memory card 125 allows the device host agent 175A to access the file if the credential is valid (step 770).

If the device host agent 175A does not have a temporary credential 135B stored for the requested content, the device host agent 175A calculates an account identifier based on the binding type for the requested content (step 738). This is similar to steps 640-645 in FIG. 15. The device host agent 175A accesses the TTP 310 using the TTP location that is stored in the file header for the requested content and sends the account identifier to the TTP 310 through secure channel 2 320 (step 740).

The TTP 310 checks if the account identifier received from the device host agent 175A is already stored in the TTP database with a temporary credential 135A (step 745). If the TTP 310 already has the temporary credential 135A associated with the account identifier, the TTP 310 sends the temporary credential 135A to the device host agent 175A through secure channel 2 320 (step 755). The device host agent 175A uses the received credential 135A to store a temporary credential 135B in the device host agent 175A for a limited amount of time (step 760). The device host agent 175A uses the temporary credential 135A to attempt to log into the account associated with the account identifier to access the file (step 765). The memory card allows the device host agent 175A to access the file if the credential is valid (step 770).

If the TTP 310 does not have a temporary credential 135A stored in its database, the TTP 310 uses the account identifier received in step 740 to request the credential from the SIM card 115 (step 750). That is, steps 455-480 of FIG. 6 are performed since a credential has not previously been requested for the requested content. The TTP 310 obtains the credential 315 from the handset 105, saves the temporary credential 135A at the TTP 310, and sends the credential to the second device 305 (see FIG. 15, steps 655-680 for more detail). The device host agent 175A on the other device 305 saves a temporary credential 135B for a limited amount of time (step 760), attempts to log in and access the file using the credential (step 765), and accesses the file if the credential 135 is valid (step 770).

Figure 17:
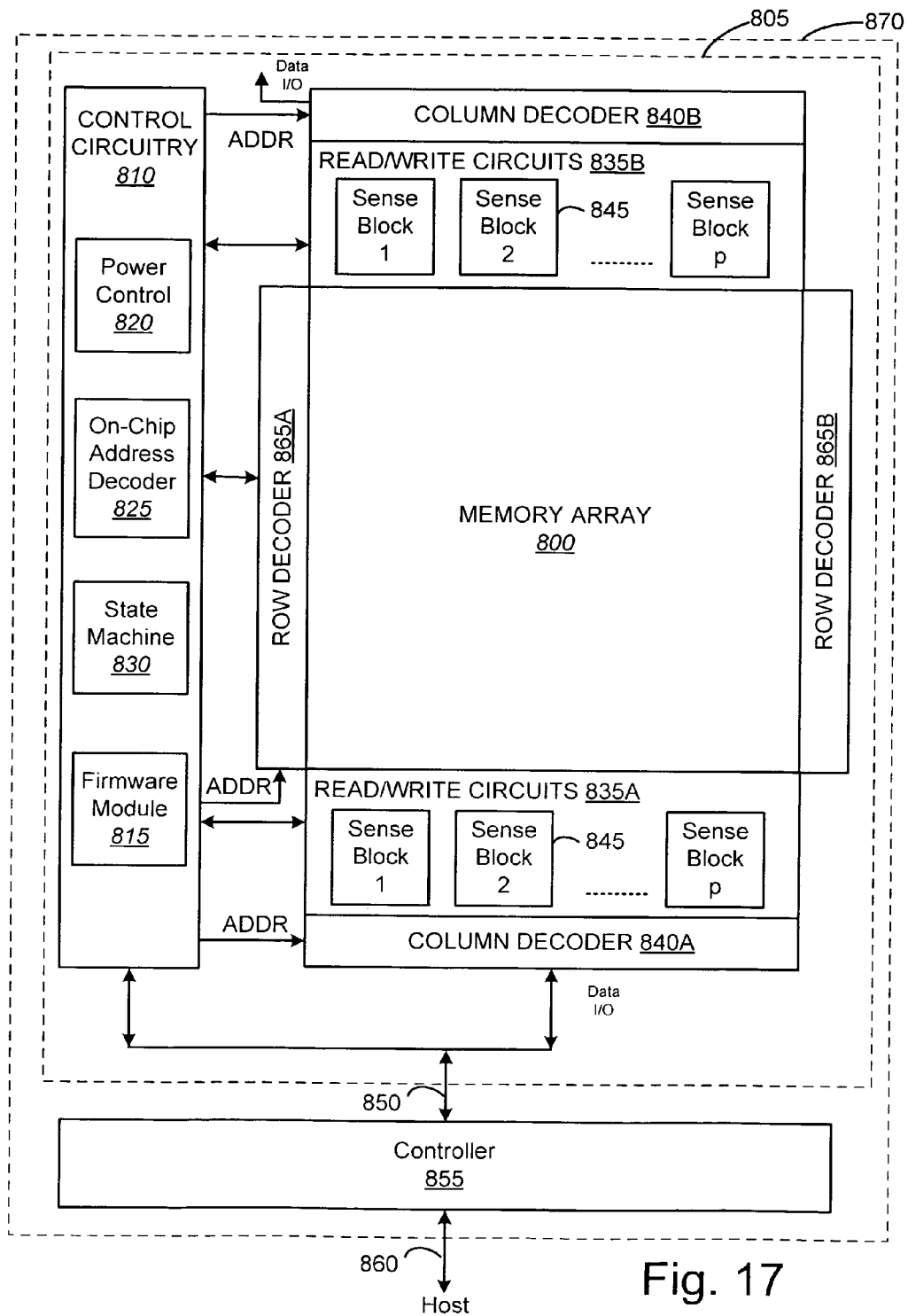
FIG. 17 is a block diagram of a memory device.

FIG. 17 illustrates a memory device 870 having read/write circuits for reading and programming a page of memory cells (e.g., NAND multi-state flash memory) in parallel. For example, the memory device 870 can be the SIM card 115 or the memory card 125. Memory device 870 may include one or more memory die or chips 805. Memory die 805 includes an array (two-dimensional or three dimensional) of memory cells 800, control circuitry 810, and read/write circuits 835A and 835B. In one embodiment, access to the memory array 800 by the various peripheral circuits is implemented in a symmetric fashion, on opposite sides of the array, so that the densities of access lines and circuitry on each side are reduced by half. The read/write circuits 835A and 835B include multiple sense blocks 845 which allow a page of memory cells to be read or programmed in parallel. The memory array 800 is addressable by word lines via row decoders 865A and 865B and by bit lines via column decoders 840A and 840B. In a typical embodiment, a controller 855 is included in the same memory device 870 (e.g., a removable storage card or package) as the one or more memory die 805. Commands and data are transferred between the host and controller 855 via lines 860 and between the controller and the one or more memory die 805 via lines 850.

Control circuitry 810 cooperates with the read/write circuits 835A and 835B to perform memory operations on the memory array 800. The control circuitry 810 includes a firmware module 815, a state machine 830, an on-chip address decoder 825 and a power control module 820. The firmware module 815 provides the security features of the memory device 870, such as encryption and decryption for example. The state machine 830 provides chip-level control of memory operations. The on-chip address decoder 825 provides an address interface between that used by the host or a memory controller to the hardware address used by the decoders 840A, 840B, 865A, and 865B. The power control module 820 controls the power and voltages supplied to the word lines and bit lines during memory operations. In one embodiment, power control module 820 includes one or more charge pumps that can create voltages larger than the supply voltage.

In one embodiment, one or any combination of control circuitry 810, power control circuit 820, decoder circuit 825, state machine circuit 830, firmware module 815, decoder circuit 840A, decoder circuit 840B, decoder circuit 865A, decoder circuit 865B, read/write circuits 835A, read/write circuits 835B, and/or controller 855 can be referred to as one or more managing circuits. The one or more managing circuits can perform memory access processes as described herein.

Figure 18:
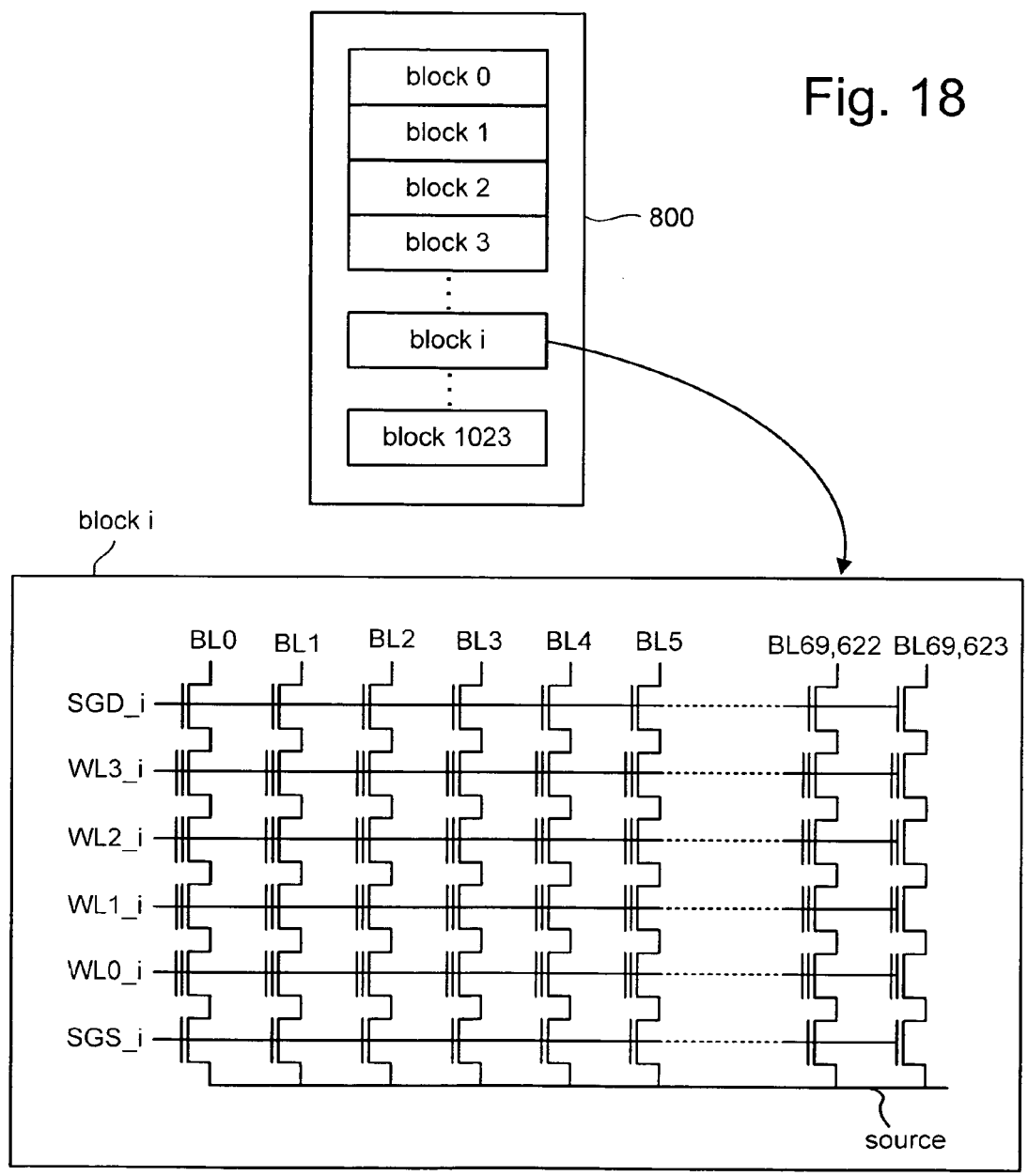
FIG. 18 is a block diagram depicting one embodiment of a memory array.

FIG. 18 depicts an exemplary structure of memory cell array 800. In one embodiment, the array of memory cells is divided into a large number of blocks (e.g., blocks 0-1023, or another amount) of memory cells. As is common for flash EEPROM systems, the block can be the unit of erase. Each block can contain the minimum number of memory cells that are erased together. Other units of erase can be used as well.

A block contains a set of NAND stings which are accessed via bit lines (e.g., bit lines BL0-BL69623) and word lines (WL0, WL1, WL2, WL3). FIG. 17 shows four memory cells connected in series to form a NAND string. Although four cells are shown to be included in each NAND string, more or less than four can be used (e.g., 16, 32, 64, 128 or another number or memory cells can be on a NAND string). One terminal of the NAND string is connected to a corresponding bit line via a drain select gate (connected to select gate drain line SGD), and another terminal is connected to the source line via a source select gate (connected to select gate source line SGS).

In one embodiment, the bit lines are divided into odd bit lines and even bit lines. In an odd/even bit line architecture, memory cells along a common word line and connected to the odd bit lines are programmed at one time, while memory cells along a common word line and connected to even bit lines are programmed at another time. In another embodiment, all memory cells connected to a common word line are programmed together.

Each block is typically divided into a number of pages. In one embodiment, a page is a unit of programming. One or more pages of data are typically stored in one row of memory cells. For example, one or more pages of data may be stored in memory cells connected to a common word line. A page can store one or more sectors. A sector includes user data and overhead data (also called system data). Overhead data typically includes header information and Error Correction Codes (ECC) that have been calculated from the user data of the sector. The controller (or other component) calculates the ECC when data is being programmed into the array, and also checks it when data is being read from the array. Alternatively, the ECCs and/or other overhead data are stored in different pages, or even different blocks, than the user data to which they pertain. A sector of user data is typically 512 bytes, corresponding to the size of a sector in magnetic disk drives. A large number of pages form a block, anywhere from 8 pages, for example, up to 32, 64, 128 or more pages. Different sized blocks, pages and sectors can also be used.

The foregoing detailed description of various embodiments is not intended to be exhaustive or to limit the disclosed technology to the precise forms disclosed. Many modifications and variations are possible in light of the above teaching. The described embodiments were chosen in order to best explain the principles of the technology and its practical application, to thereby enable others skilled in the art to best utilize the technology in various embodiments and with various modifications as are suited to the particular use contemplated. The foregoing description is not intended to thereby limit the scope of the disclosed technology as recited in claims appended hereto.

What is claimed is:

1. A method for upgrading a storage device, comprising:
performing by a host device, in response to receiving a request to replace a first storage unit with a new storage unit, the first storage unit storing first content and being bound to a third storage unit based on one or more binding types prior to receiving the request, the first storage unit being replaceable by the new storage unit in being removeably coupled to the host device, and the third storage unit being removeably coupled to the host device;

obtaining the first content stored originally in the first storage unit;

sending the first content to the new storage unit;

modifying a portion of the first content in the new storage unit based on the one or more binding types so as to bind the new storage unit to the third storage unit; and modifying second content in the third storage unit based on the one or more binding types.

2. A method according to claim 1, further comprising:
sending the first content of the first storage unit to a server, the sending the first content to the server being performed by the host device prior to sending the first content to the new storage unit;
notifying a user to remove the first storage unit from the host device and insert the new storage unit in the host device after the first content is sent to the server; and
receiving in the host device the first content from the server;
wherein sending the first content to the new storage unit comprises sending the first content received from the server to the new storage unit.

3. A method according to claim 2, wherein the sending the first content to the server comprises:
encrypting the first content in the host device; and
sending an encrypted version of the first content from the host device to the server.

4. A method according to claim 3, wherein the sending the first content to the new storage unit comprises:
decrypting the encrypted version of the first content, the decrypting is performed by the host device, and
storing the first content in the new storage unit.

5. A method according to claim 2, further comprising:
deleting the first content from the first storage unit prior to notifying the user to remove the first storage unit from the host device, the deleting is performed by the host device; and
notifying the server to delete the first content in the server, the notifying is performed by the host device after receiving the first content from the server.

6. A method according to claim 2, wherein:
the sending the first content to the server and the receiving the first content being performed through a mobile network.

7. A method according to claim 1, wherein:
the first storage unit is a Subscriber Identity Module card;
the first content includes credentials that provide access to content on the third storage unit including access to the second content; and
wherein the one or more binding types indicate a particular identifier and wherein the credentials are based on one or more identification values corresponding to the particular identifier.

8. A method according to claim 7, wherein the modifying second content comprises:
accessing the second content in the third storage unit using an existing credential from the first content, the second content having a binding type that indicates the one or more identification values identify the first storage unit;
determining a new account identifier using one or more identification values that identify the new storage unit;
sending the new account identifier to the new storage unit;

receiving a new credential from the new storage unit, the new credential is generated by the new storage unit using the new account identifier; and
associating the second content with the new account identifier and the new credential, the new credential providing access to the second content.

9. A method according to claim 8, wherein the step of modifying a portion of the first content comprises:
deleting the existing credential; and
saving the new credential.

10. A method according to claim 1, wherein:
the first storage unit is a removable non-volatile memory card;
the third storage unit is a Subscriber Identity Module card;
the first content includes files, existing accounts associated with the files, and information associated with a configuration of the files;
the second content includes credentials that provide access to the files; and
the one or more binding types indicate a particular identifier, the credentials being based on one or more identification values corresponding to the particular identifier.

11. A method according to claim 10, wherein the receiving in the host device a request to replace a first storage unit comprises:
receiving an indication that the new storage unit is inserted in the host device.

12. A method according to claim 11, further comprising:
sending a first identification value obtained from the new storage unit to a server, the sending the first identification value being performed by the host device;
notifying a user to remove the new storage unit from the host device and insert the first storage unit, the notifying performed by the host device;
sending the first content of the first storage unit to the server, the sending the first content to the server being performed by the host device prior to sending the first content to the new storage unit;
notifying a user to remove the first storage unit from the host device and insert the new storage unit in the host device after the first content is sent to the server, the notifying the user to remove the first storage unit being performed by the host device;
sending to the server a second identification value obtained from the new storage unit inserted in the host device after notifying the user to insert the new storage unit in the host device;
verifying whether the first identification value matches the second identification value, the verifying being performed by the server.

13. A method according to claim 10, wherein the sending the first content to the new storage unit comprises:
creating new accounts in the new storage unit including creating a new account for each existing account in the first content;
associating permissions of the existing accounts to the new accounts, the permissions indicate access to particular files; and
saving the files in the new storage unit based on the information associated with the configuration of the files.

14. A method according to claim 13, wherein the modifying a portion of the first content comprises:
accessing a first new account associated with the portion of the first content, the portion of the first content being associated with a binding type that indicates the one or more identification values identify the first storage unit;

determining a new account identifier using one or more identification values that identify the new storage unit;

sending the new account identifier to the third storage unit;

receiving a new credential from the third storage unit, the new credential being generated by the third storage unit using the new account identifier; and associating the new credential and the new account identifier with the first new account, the new credential provides access to the portion of the first content.

15. A method according to claim 14, wherein the modifying second content comprises:

saving the new credential; and deleting an existing credential associated with an existing account for the portion of the first content.

16. A method for upgrading a storage device, comprising:

sending a credential from a first storage unit to a server, the first storage unit being removeably coupled to a host device, the step of sending a credential to the server being controlled by a software entity on the host device;

receiving a notification that the first storage unit has been removed from the host device and that a removeably coupled new storage unit has been coupled to the host device, the receiving of a notification being controlled by the software entity;

receiving the credential from the server, the receiving the credential being controlled by the software entity; and sending the credential to the new storage unit, the sending the credential to the new storage unit being controlled by the software entity.

17. A method according to claim 16, wherein:

the credential provides access to a third storage unit that is operatively coupled to the host device, the first storage unit being associated with the third storage unit through one or more binding types prior to the new storage unit being operatively coupled to the host device.

18. A method according to claim 17, further comprising:

accessing content in the third storage unit using the credential, the content being associated with the first storage unit by an identification value that identifies the first storage unit;

determining a new account identifier using an identification value that identifies the new storage unit;

sending the new account identifier to the new storage unit;

receiving a new credential from the new storage unit, the new credential being generated using the new account identifier; and associating the content with the new account identifier and the new credential, the new credential providing the access to the content.

19. A method according to claim 18, further comprising:

creating a new account for an existing account associated with the content including creating the new account with permissions associated with the existing account, the existing account being associated with the first storage unit and the new account being associated with the new storage unit.

20. A method according to claim 18, wherein:

the content being associated with an identification value that identifies the new storage unit.

21. A method according to claim 16, further comprising:

notifying a user to operatively couple the new storage unit to the host device, the notifying being controlled by the software entity.

22. A method for upgrading a storage device, comprising:

accessing content on a first storage unit that is removeably coupled to a host device, using one or more credentials in a second storage unit, that is removeably coupled to the host device, the second storage unit being associated with the first storage unit based on the one or more credentials, the accessing content being controlled by a software entity on the host device;

sending the content under control of the software entity to a new storage unit after the new storage unit is operatively coupled to the host device; and notifying the second storage unit to generate one or more new credentials that associate the content with the new storage unit, the one or more new credentials providing access to the content, the notifying being performed by the software entity.

23. A method according to claim 22, further comprising:

creating accounts associated with the content in the new storage unit based on the one or more new credentials.

24. A method according to claim 22, further comprising:

providing to a server a first identification value obtained from the new storage unit, the providing being performed by the software entity;

notifying a user to remove the new storage unit from operative coupling with the host device and to operatively couple the first storage unit to the host device after the first identification value being provided to the server; and providing the content from the first storage unit to the server.

25. A method according to claim 24, further comprising:

notifying the user to operatively couple the new storage unit to the host device after the content of the first storage unit being provided to the server;

receiving the content from the server under control of the software entity;

wherein sending the content under control of the software entity to the new storage unit comprises sending the content received from the server.

26. A method according to claim 24, further comprising:

providing to the server a second identification value obtained from the new storage unit after notifying the user to operatively couple the new storage unit in the host device;

verifying whether the first identification value matches the second identification value, the verifying being performed by the server.

27. A method according to claim 22, wherein:

the content includes files and permissions associated with the files.

28. A method according to claim 27, wherein the sending the content to the new storage unit comprises:

encrypting the files if the permissions indicate the files should be encrypted; and saving an encrypted version of the files in the new storage unit.

* * * * *